(12) United States Patent
Ishii

(10) Patent No.: US 11,675,147 B2
(45) Date of Patent: Jun. 13, 2023

(54) OPTICAL TRANSCEIVER

(71) Applicant: SUMITOMO ELECTRIC INDUSTRIES, LTD., Osaka (JP)

(72) Inventor: Kuniyuki Ishii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 79 days.

(21) Appl. No.: 17/454,111

(22) Filed: Nov. 9, 2021

(65) Prior Publication Data

US 2022/0146768 A1    May 12, 2022

(30) Foreign Application Priority Data

Nov. 12, 2020    (JP) .............................. JP2020-188918

(51) Int. Cl.
    *G02B 6/42*           (2006.01)

(52) U.S. Cl.
    CPC ......... *G02B 6/4256* (2013.01); *G02B 6/4246* (2013.01); *G02B 6/4261* (2013.01); *G02B 6/4284* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 7,213,980 | B2 * | 5/2007 | Oki ...................... | G02B 6/4256 385/94 |
| 2003/0206403 | A1 * | 11/2003 | Zaremba .............. | G02B 6/4261 361/728 |
| 2012/0045181 | A1 * | 2/2012 | Ishii ..................... | G02B 6/4201 385/92 |
| 2012/0045182 | A1 * | 2/2012 | Ishii ..................... | G02B 6/4269 385/92 |
| 2016/0266340 | A1 | 9/2016 | Zhang et al. | |
| 2018/0136415 | A1 * | 5/2018 | Matsui ................. | G02B 6/3893 |

FOREIGN PATENT DOCUMENTS

JP          2018-508046         3/2018

* cited by examiner

*Primary Examiner* — Jerry Rahll
(74) *Attorney, Agent, or Firm* — Ipusa, PLLC

(57) ABSTRACT

An optical transceiver includes a groove-shaped accommodating portion that extends in a longitudinal direction, the housing being configured to be inserted and removed from a cage of an external device. The optical transceiver includes a movable member attached to the housing and a leaf spring member accommodated in the accommodating portion. The spring member includes a first pressing portion pressing a protrusion toward a first surface of the accommodating portion. The spring member includes and a second pressing portion pressing, in the longitudinal direction, a second surface of the accommodating portion. An end of the spring member toward the first pressing portion is configured to curve away from the first surface of the accommodating portion in the longitudinal direction as a distance from first pressing portion increases.

10 Claims, 17 Drawing Sheets

US 11,675,147 B2

OPTICAL TRANSCEIVER

CROSS-REFERENCE TO RELATED APPLICATION

This application claims priority under 35 U.S.C. § 119 to Japanese Patent Application No. 2020-188918, filed Nov. 12, 2020, the contents of which are incorporated herein by reference in their entirety.

BACKGROUND

1. Field of the Invention

The present invention relates to an optical transceiver.

2. Description of the Related Art

An optical transceiver is disclosed as including a spring for returning a pull tab to an initial position, and the spring is provided between a housing and the pull tab (Patent Document 1).

CITATION LIST

Patent Document

[Patent Document 1] Published Japanese Translation of PCT International Application No. 2018-508046

SUMMARY

According to one aspect of an embodiment, an optical transceiver includes a housing extending in a longitudinal direction of the optical transceiver, the housing including a groove-shaped accommodating portion that extends in the longitudinal direction, and the housing being configured to be inserted and removed from a cage of an external device. The accommodating portion includes a first surface and a second surface that are apart from each other in the longitudinal direction, the longitudinal direction being directed to a direction in which the housing is to be inserted into the cage. The accommodating portion includes a third surface constituting a bottom of the accommodating portion, the third surface coupling the first surface and the second surface. The optical transceiver includes a movable member including a protrusion that protrudes into the accommodating portion, the movable member being attached to the housing in a state where the movable member is movable in the longitudinal direction, within a predetermined distance. The optical transceiver includes a spring member that is a curved leaf spring that is accommodated in the accommodating portion. The spring member includes a first pressing portion pressing the protrusion toward the first surface of the accommodating portion, the first pressing portion having an end. The spring member includes a second pressing portion pressing, in the longitudinal direction, the second surface of the accommodating portion, in a direction in which the second surface of the accommodating portion is away from the first surface of the accommodating portion. The spring member includes a coupling portion that is curved and couples the first pressing portion and the second pressing portion, the coupling portion being in contact with the third surface of the accommodating portion. The end of the spring member toward the first pressing portion is configured to curve away from the first surface of the accommodating portion in the longitudinal direction as a distance from first pressing portion increases.

DESCRIPTION OF EMBODIMENTS

Figure 1:
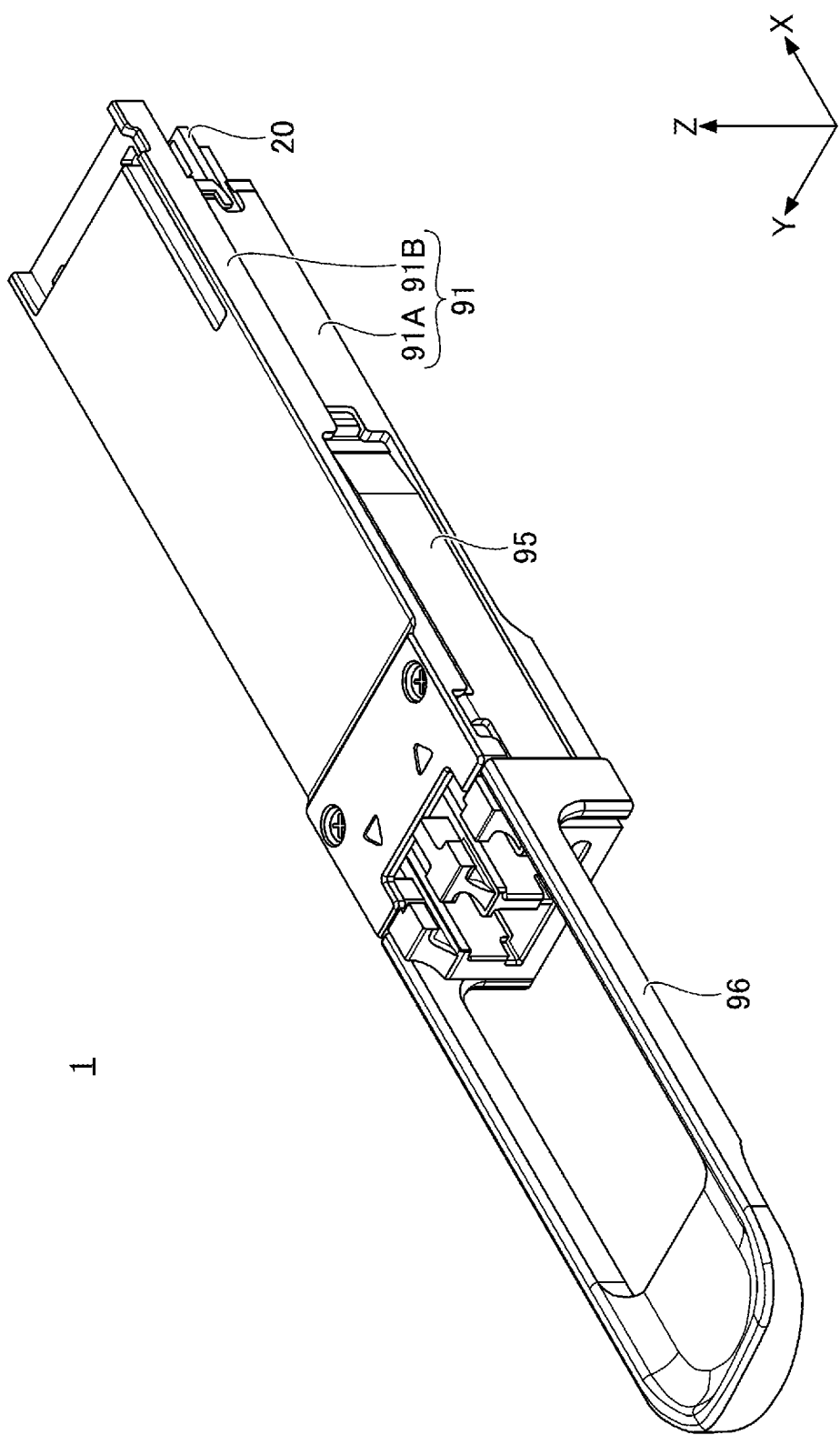
FIG. 1 is a perspective view of an example of an optical transceiver according to one embodiment.

Related art information relevant to the present disclosure recognized by the inventor of this application will be provided below. A hot swappable optical transceiver has been known to be inserted into a cage of a host system to thereby engage with the cage. When the optical transceiver engages with the cage, a pull tab exposed from the cage is at an initial position and the optical transceiver cannot be removed from the cage. By pulling the pull tab in the initial position in a direction opposite an insertion direction, engagement of the optical transceiver with the cage is released, and thus the optical transceiver can be removed from the cage. Except for when the optical transceiver is removed from the cage, a spring is preloaded such that the pull tab is maintained in the initial position. In other words, the spring is in a state deformed from a natural state, even when the pull tab is in the initial position. For this reason, during assembly of the conventional optical transceiver, the spring is attached between a housing and the pull tab, with being affected by a reaction force generated due to deformation of the spring. If the spring is deformed excessively during mounting of the spring, a permanent set-in fatigue may occur. In order to make the optical transceiver compact, a small spring needs to be mounted in a narrow space. For example, a spring so small that the spring cannot be handled with bare hands needs to be accommodated in a narrow place by deforming the spring appropriately. Thus, assembling of the conventional optical transceiver is troublesome. In particular, when compression coil springs are used, a troublesome assembly operation may need to be performed.

An object of the present disclosure is to provide an optical transceiver that can be simply assembled.

One or more embodiments will be hereinafter described.

DESCRIPTION OF EMBODIMENTS OF THE PRESENT DISCLOSURE

The embodiments of the present disclosure will be described below. In the following description, the same or corresponding elements are denoted by same numerals, and description thereof will be not provided repeatedly.

An optical transceiver according to a first aspect of the present disclosure a housing extending in a longitudinal direction of the optical transceiver, the housing including a groove-shaped accommodating portion that extends in the longitudinal direction, and the housing being configured to be inserted and removed from a cage of an external device. The accommodating portion includes a first surface and a second surface that are apart from each other in the longitudinal direction, the longitudinal direction being directed to a direction in which the housing is to be inserted into the cage. The accommodating portion includes a third surface constituting a bottom of the accommodating portion, the third surface coupling the first surface and the second surface. The optical transceiver includes a movable member including a protrusion that protrudes into the accommodating portion, the movable member being attached to the housing in a state where the movable member is movable in the longitudinal direction, within a predetermined distance. The optical transceiver includes a spring member that is a curved leaf spring and is accommodated in the accommodating portion. The spring member includes a first pressing portion pressing the protrusion toward the first surface of the accommodating portion, the first pressing portion having an end. The spring member includes a second pressing portion pressing, in the longitudinal direction, the second surface of the accommodating portion, in a direction in which the second surface of the accommodating portion is away from the first surface of the accommodating portion. The spring member includes a coupling portion that is curved and couples the first pressing portion and the second pressing portion, the coupling portion being in contact with the third surface of the accommodating portion. The end of the spring member toward the first pressing portion is configured to curve away from the first surface of the accommodating portion in the longitudinal direction as a distance from first pressing portion increases.

A spring member includes a first pressing portion, a second pressing portion, and a coupling portion, and the coupling portion contacts a third surface of an accommodating portion that constitutes a bottom of a housing. With this arrangement, during assembly of an optical transceiver, when a spring member is inserted into the housing, and thus the coupling portion contacts the third surface of the accommodating portion, the first pressing portion contacts the first surface of the accommodating portion, and the second pressing portion contacts the second surface of the accommodating portion. Accordingly, a preload is applied to the spring member, without any load being externally applied to each of the first pressing portion and the second pressing portion. Also, the end of the spring member toward the first pressing portion is curved in a longitudinal direction away from the first surface of the accommodating portion, with increasing a distance from the first pressing portion. With this arrangement, a protrusion of a movable member can be easily inserted between a first pressing portion and a first surface of an accommodating portion. Thus, a spring member and the movable member can be attached to a housing with simple operations.

In a second aspect of the present disclosure according to the first aspect, a spring member is accommodated in an accommodating portion so that a coupling portion of the spring member can preload a first pressing portion and a second pressing portion in a direction in which the first pressing portion and the second pressing portion are apart from each other. In this case, after an optical transceiver is removed from a cage, a movable member is easily returned to a position set prior to removal of the optical transceiver.

In a third aspect of the present disclosure according to the first aspect or the second aspect, a coupling portion of a spring member includes a flat plate coupled to a first pressing portion. An end of the first pressing portion of the spring member may be curved, toward a second pressing portion, at an angle relative to the flat plate, the angle being greater than or equal to 50 degrees and less than or equal to 70 degrees. In this case, a protrusion is easily inserted between an end of the spring member and a first surface of an accommodating portion.

In a fourth aspect of the present disclosure according any one of the first to third aspects, a spring member includes a first slit extending from a first pressing portion toward a third surface of an accommodating portion, the first slit having a width that increases toward the first pressing portion from a coupling portion. The spring member includes a second slit extending from the second pressing portion toward the third surface of the accommodating portion, and the second slit may have a width that increases toward the second pressing portion from the coupling portion. In this case, uniformity of stress acting on a coupling portion is increased, and thus deterioration of a spring member due to stress concentration is easily mitigated.

In a fifth aspect of the present disclosure according to the fourth aspect, an accommodating portion may include a limiting portion that protrudes from a second surface of an accommodating portion toward a first surface of the accommodating portion, the limiting portion passing through the second slit, and the limiting member limiting a range of travel of the spring member. In this case, with use of a limiting portion, a range of travel of a spring member, such as rotation of the spring member, is limited, and thus detachment of the spring member from the accommodating portion is substantially prevented.

In a sixth aspect of the present disclosure according to any one of first to fifth aspects, an accommodating portion includes a fourth surface coupled to an edge of a first surface of the accommodating portion opposite a third surface thereof. The fourth surface of the accommodating portion may be inclined away from a second surface of the accommodating portion in a longitudinal direction as a distance from the edge of the first surface thereof increases. In this case, a protrusion is easily inserted between an end of a spring member and a first surface of an accommodating portion.

In a seventh aspect of the present disclosure according to any one of first to sixth aspects, a protrusion includes a fifth surface in contact with a first pressing portion and a sixth surface facing a third surface of an accommodating portion. A portion of the protrusion at which the fifth surface and sixth surface meet may be chamfered. In this case, a protrusion is easily inserted between an end of a spring member and a first surface of an accommodating portion.

In an eighth aspect of the present disclosure according to any one of first to seventh aspects, a portion of a coupling portion in contact with a third surface of an accommodating portion is curved with a first radius of curvature. The third surface of the accommodating portion may include a curved surface within a region of the accommodating portion in contact with the coupling portion, the curved surface being formed with a second radius of curvature greater than the first radius of curvature. In this case, rotation of a spring member can be limited, while enabling deformation of a spring member in accordance with movement of a movable member.

In a ninth aspect of the present disclosure according to any one of first to eighth aspects, a movable member may include a pair of plates attached to a housing such that the housing is interposed between the pair of plates in a transverse direction of the housing perpendicular to a longitudinal direction. In this case, loads applied to a movable member can be distributed when an optical transceiver is removed from a cage.

In a tenth aspect of the present disclosure according to the ninth aspect, a movable member may further include a bridging portion for bridging a pair of plates. In this case, loading eccentricity between both plates can be reduced.

Embodiments of the Present Disclosure

Figure 2:
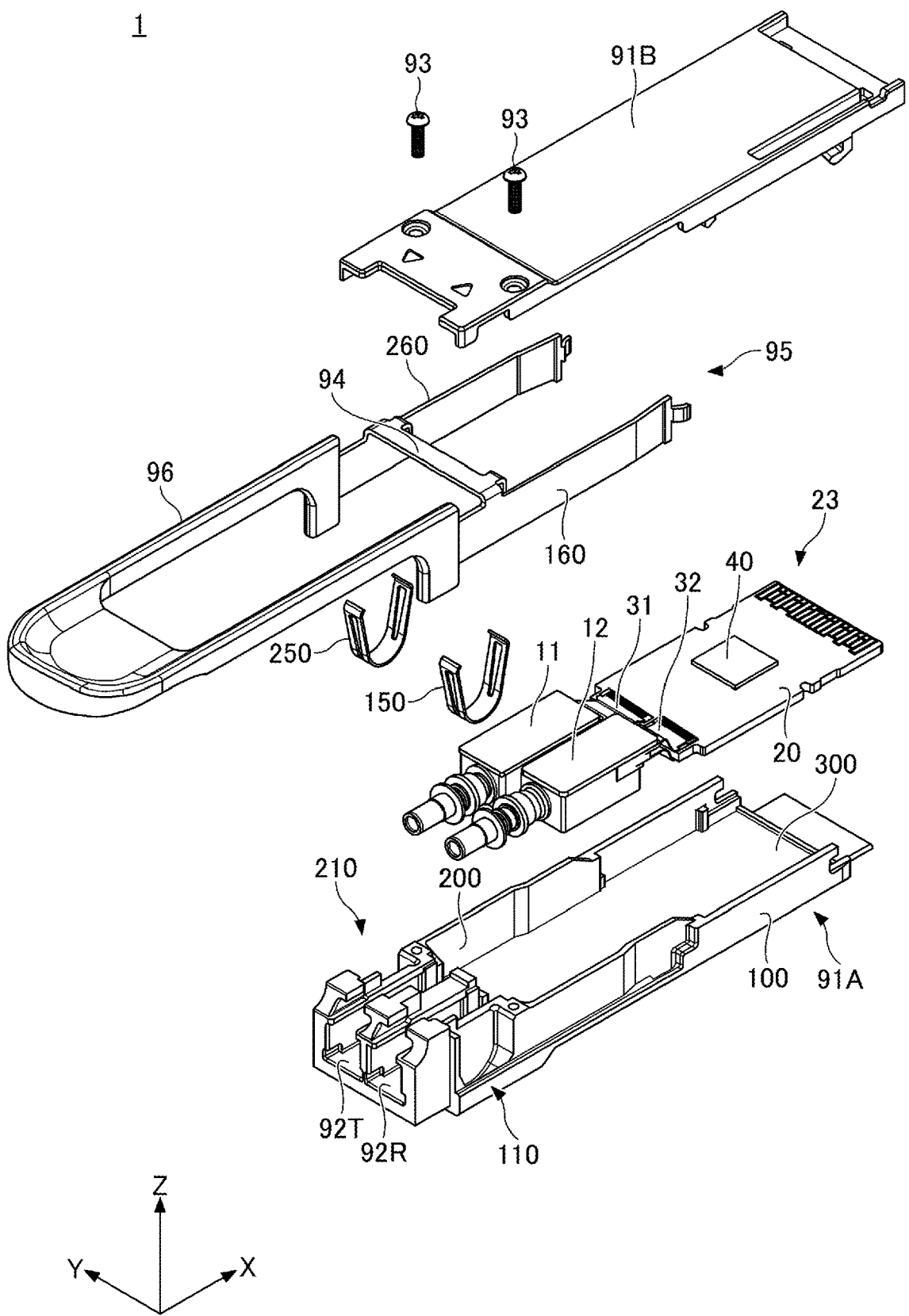
FIG. 2 is an exploded perspective view of an example of the optical transceiver according to one embodiment.

Embodiments of the present disclosure relate to an optical transceiver that can be inserted and removed from, for example, a cage of a host system (optical transmission apparatus). FIG. 1 is a perspective view of an example of the optical transceiver according to one embodiment. FIG. 2 is an exploded perspective view of an example of the optical transceiver according to one embodiment. In each figure, an XYZ orthogonal coordinate system is set for convenience of description. For example, a direction in which the optical transceiver can be inserted and removed from the cage is referred to as the X-axis direction. For example, the Y-axis direction is a direction in which two optical receptacles, which will be described later, are arranged. In the present disclosure, the planar shape refers to a shape when viewed in the Z-axis direction.

As illustrated in FIG. 1, an optical transceiver 1 according to one embodiment includes a housing 91, a slider 95, and a pull tab 96.

The housing 91 has a planar shape having a longitudinal direction and a transverse direction. The housing 91 has a generally cuboid shape of which the longitudinal side is longer than the short side. In the present embodiment, the longitudinal direction is referred to as the X-axis direction and the transverse direction is referred to as the Y-axis direction. The longitudinal direction is, for example, the direction in which the optical transceiver 1 is inserted and removed from the cage. The transverse direction is a direction perpendicular to the longitudinal direction. The housing 91 includes, for example, a lower housing 91A and an upper housing 91B. The lower housing 91A and the upper housing 91B are disposed to be opposed to each other in a height direction. The height direction is referred to as the Z-axis direction. The height direction is perpendicular to both the longitudinal direction and the transverse direction. The lower housing 91A has an inner space for accommodating components in an interior of the lower housing. The inner space is open in the positive Z-direction. The upper housing 91B is secured to the lower housing 91A so as to cover and close an opening in the lower housing 91A. The lower housing 91A and the upper housing 91B are made of metal, for example.

An optical receptacle 92T for transmission and an optical receptacle 92R for reception are provided at one end (negative X-side end) of the lower housing 91A in the X-axis direction. The housing 91 can be inserted into the cage of the host system, in the positive X-direction. The housing 91 can be also removed from the cage, in the negative X-direction, with use of the pull tab 96 described later. The optical receptacles 92T and 92R are, for example, LC-type receptacles. For example, the optical receptacle 92T is provided toward the positive Y-direction with respect to the optical receptacle 92R. The optical receptacle 92T and the optical receptacle 92R are arranged, side by side, in the Y-axis direction. The optical transceiver 1 transmits a light signal through an optical fiber coupled to the optical receptacle 92T, and receives a light signal through another optical fiber coupled to the optical receptacle 92R. When the housing 91 is inserted into the cage, the optical receptacle 92T and the optical receptacle 92R externally faces the host system, without being accommodated in the cage, and can be coupled to an optical connector provided at a distal end of the optical fiber. In the following description, in the X-axis direction, the side (negative X-side) of the lower housing 91A where the optical receptacles 92T and 92R are provided may be referred to as a front side, and the side (positive X-side) opposite the front side may be referred to as a rear side.

The lower housing 91A has a first sidewall 100 and a second sidewall 200 that are arranged in the transverse direction of the housing 91. The second sidewall 200 is provided toward the positive Y-direction with respect to the first sidewall 100. The first sidewall 100 constitutes part of the optical receptacle 92R and the second sidewall 200 constitutes part of the optical receptacle 92T. The lower housing 91A has a bottom wall 300 that couples negative Z-side ends of the first sidewall 100 and the second sidewall 200. The bottom wall 300 constitutes part of each of the optical receptacles 92R and 92T. A groove-shaped first accommodating portion 110 that extends in the X-axis direction is formed at the first sidewall 100, and a groove-shaped second accommodating portion 210 that extends in the X-axis direction is formed at the second sidewall 200. The first accommodating portion 110 accommodates a leaf spring 150 described later, and the second accommodating portion 210 accommodates a leaf spring 250 described later.

The housing 91 has a shape that is approximately symmetrical with respect to a ZX plane passing a middle portion of the housing 91 in the Y-axis direction. For example, the first sidewall 100 is plane-symmetrical with the second sidewall 200. For example, the first accommodating portion 110 is plane-symmetrical with the second accommodating portion 210. For example, the optical receptacle 92R is plane-symmetrical with the optical receptacle 92T. For this reason, the description for one-side component may equally apply to another-side component symmetrical to the one-side component. Likewise, the description for leaf springs 150 and 250, the slider 95, and the like applies as in the symmetric components described above.

Figure 3:
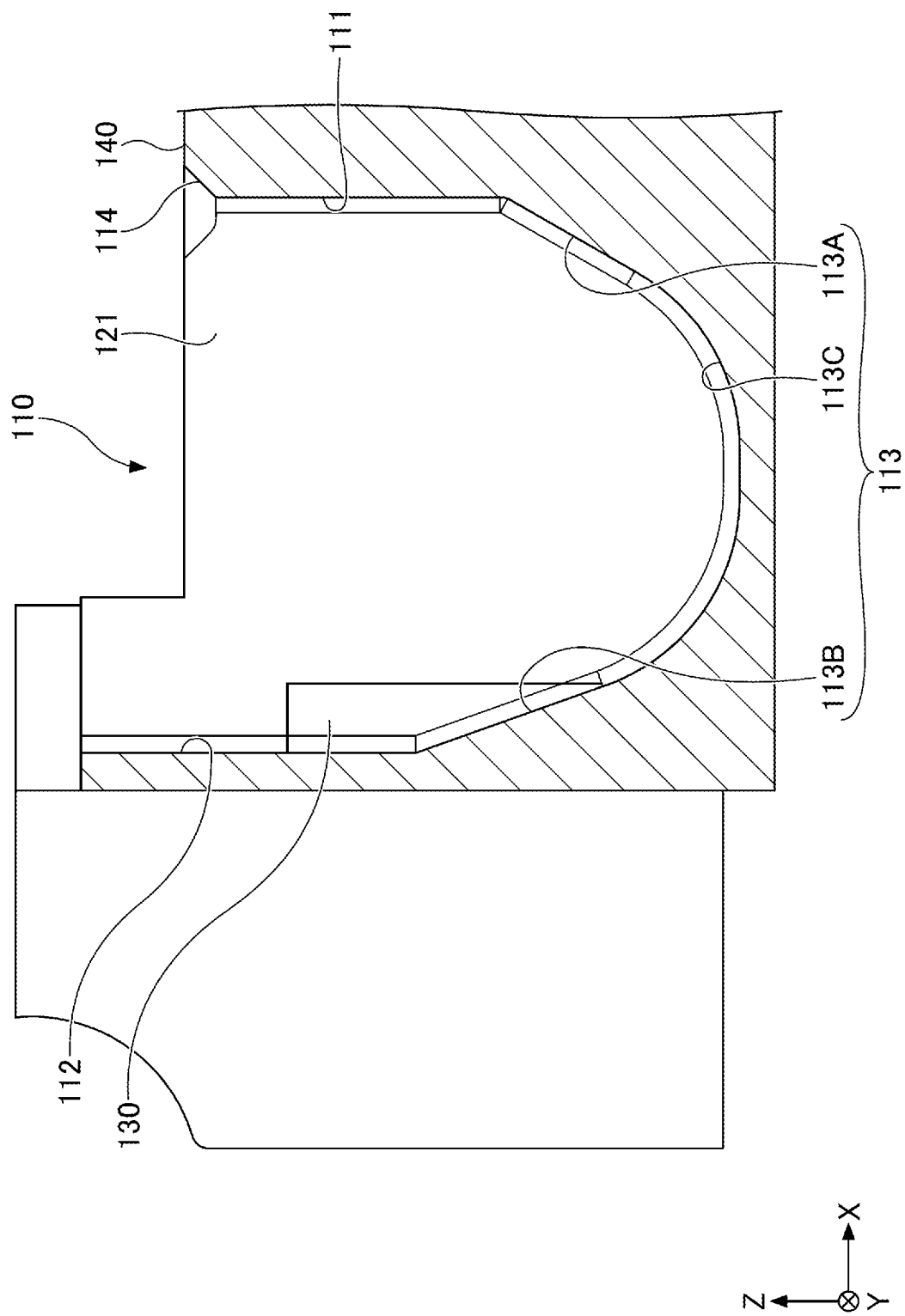
FIG. 3 is a cross-sectional view of an example of a first accommodating portion.
Figure 4:
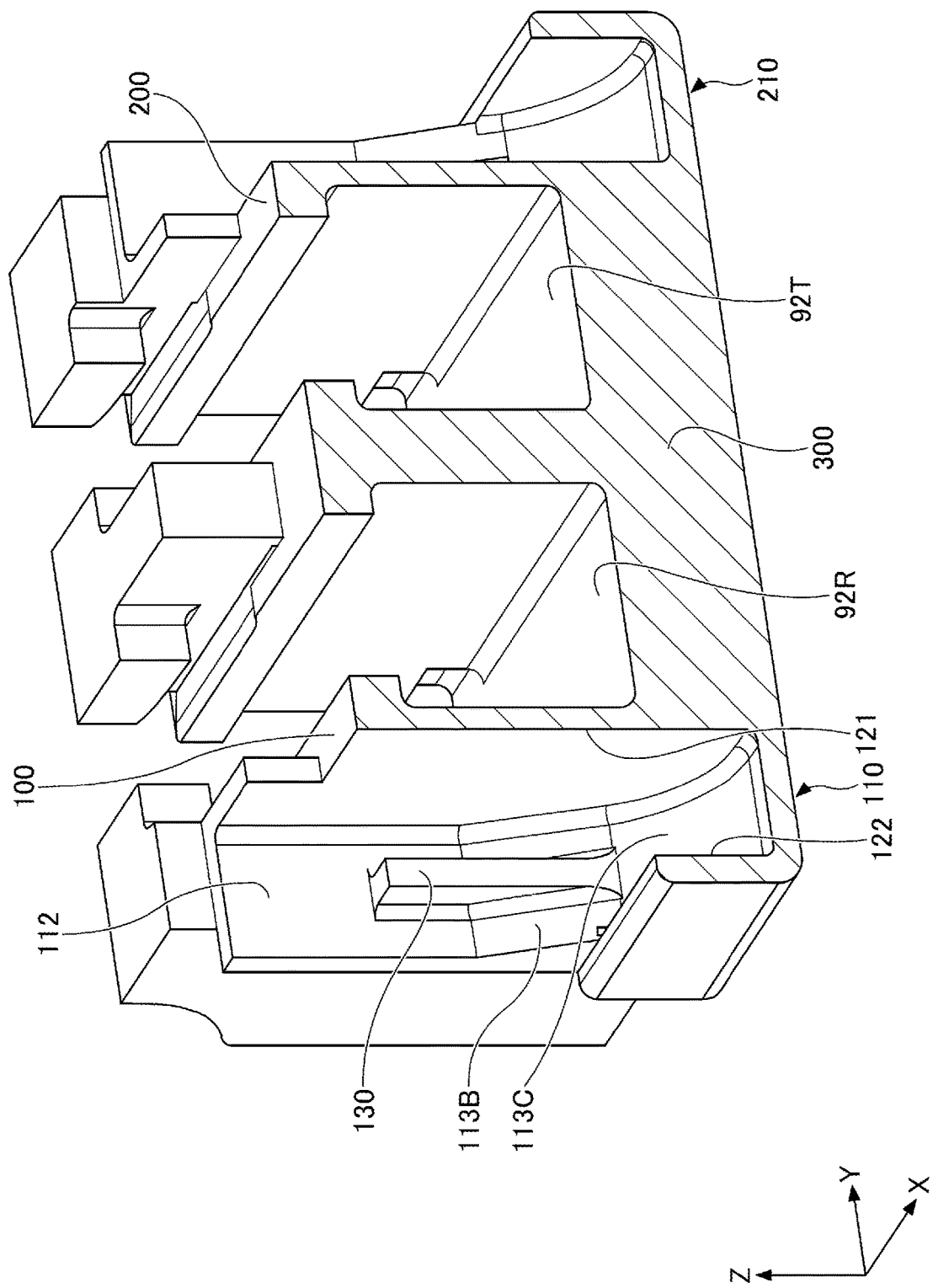
FIG. 4 is a perspective cross-sectional view of an example of the first accommodating portion and a second accommodating portion.

The first accommodating portion 110 and the second accommodating portion 210 will be described below. FIG. 3 is a cross-sectional view of an example of the first accommodating portion 110. FIG. 4 is a perspective cross-sectional view of an example of the first accommodating portion 110 and the second accommodating portion 210.

The first accommodating portion 110 is provided at the outer surface of the first sidewall 100 so as to open in the positive Z-direction. The first accommodating portion 110 has a first surface 111 and a second surface 112 that are apart from each other in the X-axis direction, and has a third surface 113 that couples the first surface 111 and the second surface 112. The third surface 113 of the first accommodating portion 110 constitutes the bottom of a groove. For example, the first surface 111, the second surface 112, and the third surface 113 of the first accommodating portion 110 constitute a U-shaped inner surface that opens in the positive Z-direction. In such a case, the first surface 111 is provided toward the rear side (positive X-side) of the second surface 112. That is, the first surface 111 is located at a distance from the second surface 112, in the X-axis direction (longitudinal direction of the housing 91) directed to a direction in which the optical transceiver 1 is inserted into the cage through the second surface 112 of the first accommodating portion 110. For example, the first surface 111 and the second surface 112 are surfaces that are each perpendicular to the X-axis direction. For example, the third surface 113 includes a curved surface 113C that is curved with a second radius of curvature, a flat surface 113A coupling the curved surface 113C and the first surface 111, and a flat surface 113B coupling the curved surface 113C and the second surface 112.

The first accommodating portion 110 has a first wall surface 121 and a second wall surface 122 that are apart from each other in the Y-axis direction. The first wall surface 121 is provided toward the positive Y-direction with respect to the second wall 122. For example, the first wall surface 121 and the second wall surface 122 are surfaces perpendicular to the Y-axis direction. Each of the first wall surface 121 and the second wall surface 122 is coupled to the first surface 111, second surface 112, and third surface 113. The dimension of the second wall surface 122 in the Z-axis direction is smaller than the dimension of the first wall surface 121 in the Z-axis direction. For example, a boundary between the flat surface 113A and the curved surface 113C, as well as a boundary between the flat surface 113B and the curved surface 113C, are located toward the negative Z-direction with respect to the positive Z-side end of the second wall 122.

The first accommodating portion 110 includes a limiting portion 130 that protrudes from the second surface 112 toward the first surface 111, and the limiting portion 130 limits a range of travel of the leaf spring 150. The limiting portion 130 may protrude from the second surface 112 and the flat surface 113B, toward the first surface 111.

The lower housing 91A has a top surface 140 in the positive Z-direction. A portion of the lower housing 91A at which the first surface 111 of the first accommodating portion 110 and the top surface 140 meet is chamfered to thereby form a fourth surface 114. With this arrangement, the fourth surface 114 of the lower housing 91A is coupled to an edge of the first surface 111 opposite the third surface 113 of the first accommodating portion 110. The fourth surface 114 of the first accommodating portion 110 is also inclined away from the second surface 112 in the X-axis direction, with decreasing a distance from the top surface 140 of the lower housing 91A in the Z-axis direction, that is, with increasing a distance from the edge of the first surface 111 of the first accommodating portion 110. The chamfer of the fourth surface 114 is, for example, an edge cut at any angle, but may be a rounded-curve edge.

For example, the distance in the X-axis direction between the first surface 111 and the second surface 112 is about 7 mm to about 9 mm, for example. The distance between the first wall surface 121 and the second wall surface 122 is, for example, about 2 mm to about 3 mm. The depth of the first accommodating portion 110, from the top surface 140, is about 7 mm to about 9 mm, for example. A second radius of curvature is about 3.0 mm, for example.

Figure 5:
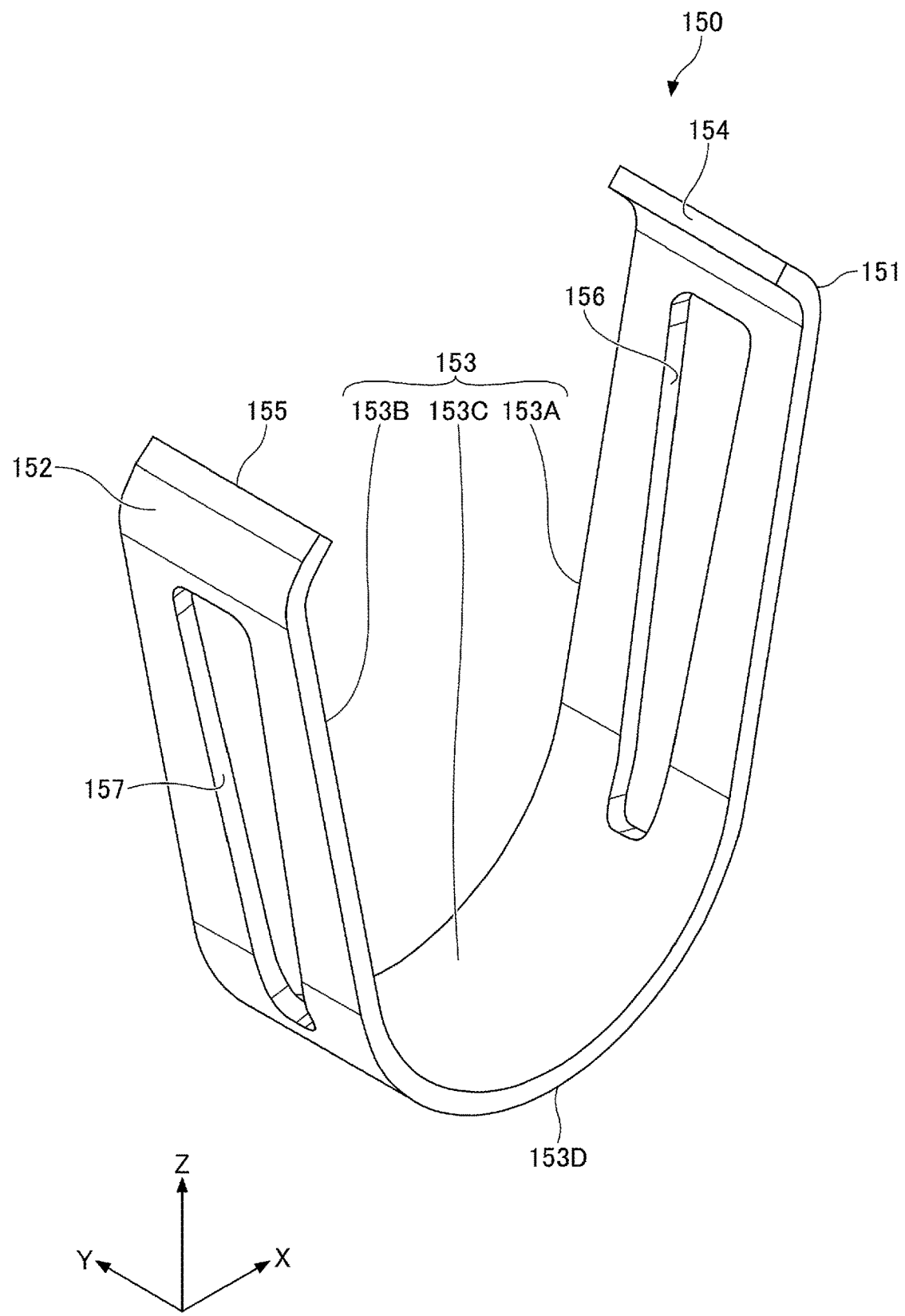
FIG. 5 is a perspective view of an example of a leaf spring.
Figure 6:
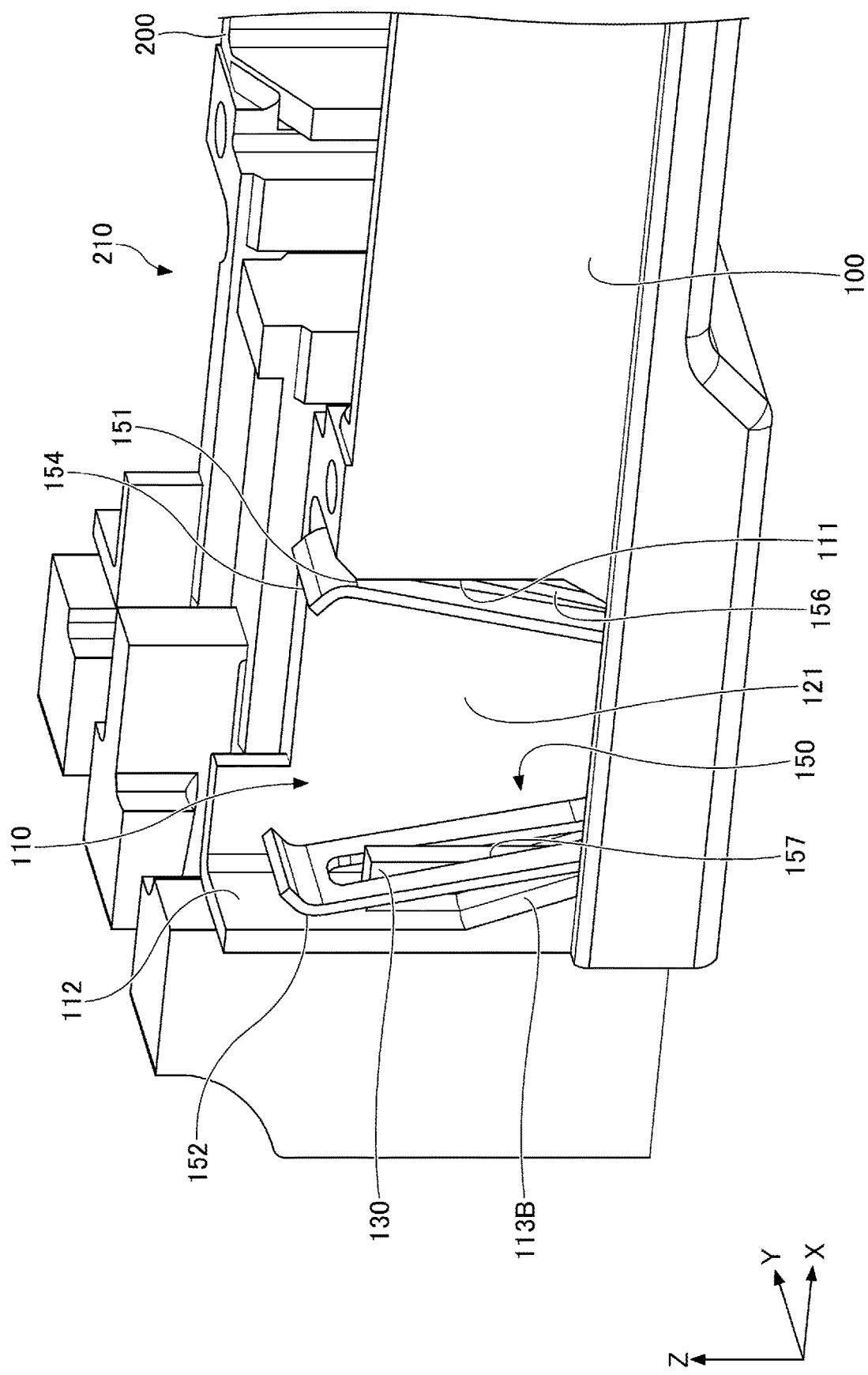
FIG. 6 is a perspective view of an example of the first accommodating portion and the leaf spring.

Hereafter, the leaf spring 150 will be described. FIG. 5 is a perspective view of an example of the leaf spring 150. FIG. 6 is a perspective view of an example of the first accommodating portion 110 and the leaf spring 150. The leaf spring 150 is an example of a spring member.

The leaf spring 150 is formed by, for example, curving a metal plate in one direction. The thickness of the leaf spring 150 is about 0.2 mm to about 0.3 mm. As illustrated in FIG. 6, the leaf spring 150 is accommodated in the first accommodating portion 110. The leaf spring 150 includes a first pressing portion 151, a second pressing portion 152, and a coupling portion 153. The coupling portion 153 couples the first pressing portion 151 and the second pressing portion 152 and is in contact with the third surface 113 of the first accommodating portion 110. The first pressing portion 151 presses the protrusion 170 described below, toward the first surface 111 of the first accommodating portion 110. The second pressing portion 152 presses the second surface 112 of the first accommodating portion 110 in the X-axis direction directed to a direction away from the first surface 111 of the first accommodating portion 110, that is, in the negative X-direction. The leaf spring 150 is made of metal such as a stainless steel or phosphor bronze. The leaf spring 150 is accommodated in the first accommodating portion 110 and thus the coupling portion 153 preloads the first pressing portion 151 and the second pressing portion 152 in a direction in which those pressing portions are apart from each other.

For example, the coupling portion 153 includes a curved portion 153C that is curved with a first radius of curvature, and includes flat plates 153A and 153B that are coupled to respective ends of the curved portion 153C. The flat plate 153A couples the curved portion 153C and the first pressing portion 151. The flat plate 153B couples the curved portion 153C and the second pressing portion 152. The first radius of curvature is about 2.8 mm, for example, and the second radius of curvature (about 3.0 mm) is greater than the first radius of curvature. The end 154 of the leaf spring 150 toward the first pressing portion 151 is curved toward the second pressing portion 152. That is, the end 154 of the leaf spring 150 is curved away from the first surface 111 of the first pressing portion 151 in the X-axis direction, with increasing a distance from the first pressing portion 151. In the X-axis direction, the end 154 of the leaf spring 150 is curved at an angle in the range of from 50 degrees through 70 degrees, relative to the flat plate 153A. For example, the leaf spring 150 is curved at an angle of about 60 degrees. The curved angle of the end 154 of the first pressing portion 151 is preferably greater than or equal to 55 degrees and less than or equal to 65 degrees. The end 155 of the leaf spring 150 toward the second pressing portion 152 may be curved toward the first pressing portion 151. In other words, the end 155 of the leaf spring 150 may be away from the second surface 112 in the X-axis direction as the distance from the second pressing portion 152 increases. The end 155 of the leaf spring 150 may be curved at an angle in the range of from, e.g., 50 degrees through 70 degrees, relative to the flat plate 153B. For example, the end 155 of the leaf spring 150 may be curved at an angle of about 60 degrees. The plate portions 153A and 153B are flat in, for example, a natural state, and may be slightly curved in a state in which the leaf spring 150 is accommodated in the first accommodating portion 110. For example, the natural state is a state in which the leaf spring 150 is not accommodated in the first accommodating portion and is not deformed due to an external force or the like.

The leaf spring 150 includes a first slit 156 and a second slit 157. The first slit 156 extends from the first pressing portion 151 toward a top 153D of a curved portion 153C, and the second slit 157 extends from the second pressing portion 152 toward the top 153D of the curved portion 153C. For example, the first slit 156 is formed from the flat plate 153A to the curved portion 153C, and the second slit 157 is formed from the flat plate 153B toward the curved portion 153C. When the leaf spring 150 is accommodated in the first accommodating portion 110, the first slit 156 extends from the first pressing portion 151 toward the third surface 113 of the first accommodating portion 110, and the second slit 157 extends from the second pressing portion 152 toward the third surface 113 of the first accommodating portion 110.

For example, the width (dimension in the Y-axis direction) of the leaf spring 150 is about 2 mm to about 3 mm, and is uniformly set from the end 154 of the leaf spring 150 to the end 155 thereof, through the coupling portion 153. The width of the first slit 156 is not uniformly set and is wider toward the first pressing portion 151 from the coupling portion 153. With this arrangement, a total sum of widths of two portions of the leaf spring 150 between which the first slit 156 is interposed in the Y-axis direction becomes smaller as the distance between the first slit 156 and the first pressing portion 151 decreases. Likewise, the width of the second slit 157 is not uniformly set and is wider toward the second pressing portion 152 from the coupling portion 153. With this arrangement, a total sum of widths of two portions of the leaf spring 150 between which the second slit 157 is interposed in the Y-axis direction becomes smaller as the distance between the second slit 157 and the second pressing portion 152 decreases.

When the leaf spring 150 is in a natural state, an angle between the flat plate 153A and the flat plate 153B is about 30 degrees, for example. In the natural state, a maximum size of the leaf spring 150 in the X-axis direction is about 8.0 mm, which is greater than a distance (about 7.8 mm) between the first surface 111 and the second surface 112 of the first accommodating portion 110. With this arrangement, the leaf spring 150 accommodated in the first accommodating portion 110 is compressed in the X-axis direction and thus the coupling portion 153 constantly preloads in a direction in which the first pressing portion 151 and the second pressing portion 152 are apart from each other. When the leaf spring 150 is accommodated in the first accommodating portion 110, the first pressing portion 151 and the second pressing portion 152 are deformed so as to be close to each other, in comparison to a case in which the leaf spring 150 is in a natural state. Thus, each of the first pressing portion 151 and the second pressing portion 152 is preloaded.

As illustrated in FIG. 6, the leaf spring 150 is accommodated in the first accommodating portion 110 such that the first pressing portion 151 faces the first surface 111 of the first accommodating portion 110, the second pressing portion 152 faces the second surface 112 of the first accommodating portion 110, and the top portion 153D of the curved portion 153C contacts the third surface 113 of the first accommodating portion 110. The first wall surface 121 and the second wall surface 122 of the first accommodating portion 110 limit travel of the leaf spring 150 proximal to the curved portion 153C in the Y-axis direction. The limiting portion 130 of the first accommodating portion 110 passes through the second slit 157. The limiting portion 130 limits a rotatable range of the leaf spring 150 in the ZX plane and limits travel of the leaf spring 150 proximal to the flat plate 153B in the Y-axis direction.

Figure 7:
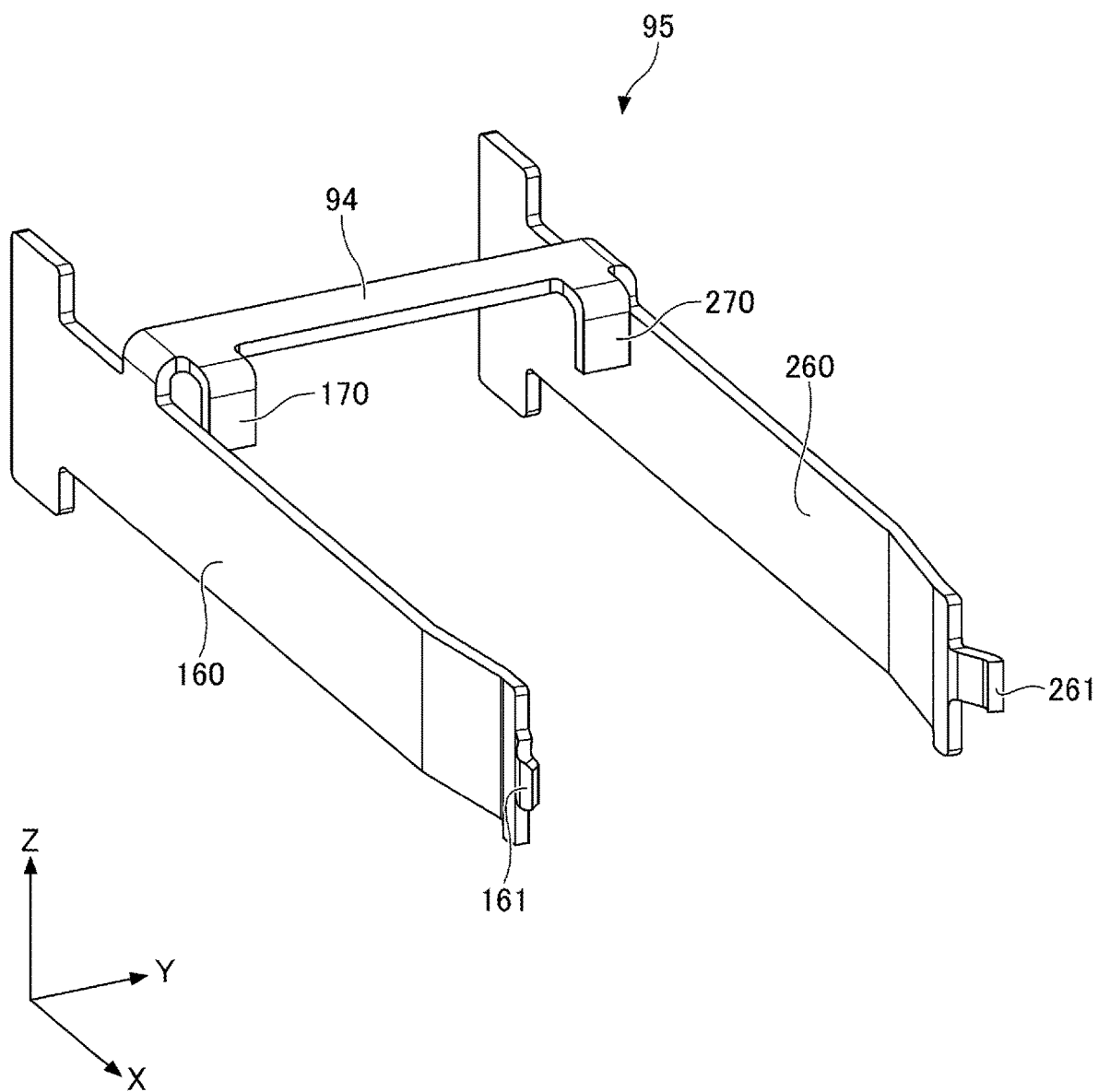
FIG. 7 is a perspective view of an example of a slider.
Figure 8:
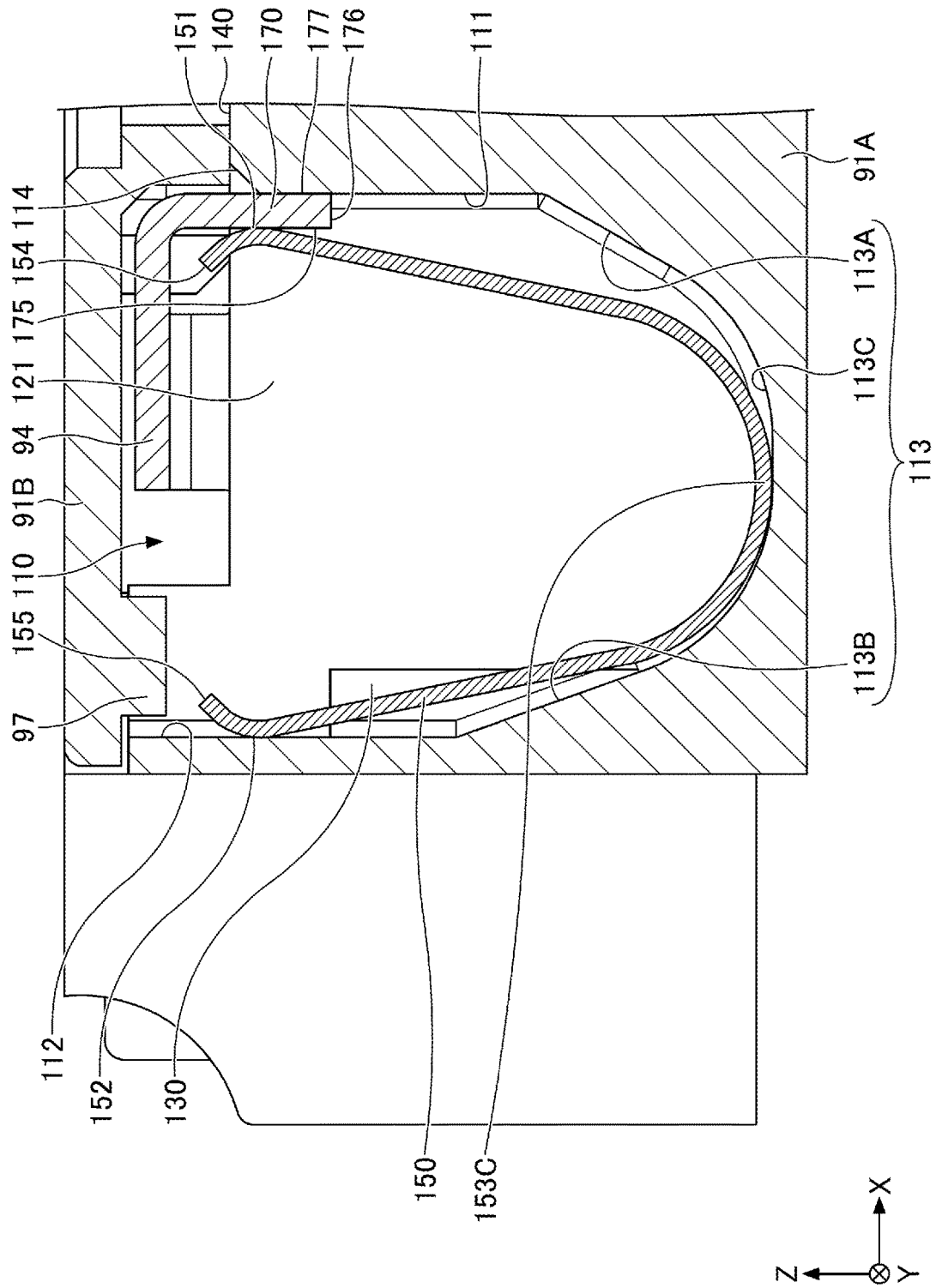
FIG. 8 is a cross-sectional view of an example of an upper housing, the slider, the first accommodating portion, and the leaf spring.

Hereafter, the configuration of the slider 95 will be described. The slider 95 is attached to the lower housing 91A such that the slider 95 can slide in the X-axis direction. The pull tab 96 is secured to the slider 95. The slider 95 is made of metal, for example. The slider 95 is formed by, for example, curving a metal plate. The slider 95 is formed by a sheet metal processing process, for example. For example, the thickness of the metal plate of the slider 95 is about 0.5 mm. For example, the pull tab 96 is made of resin. FIG. 7 is a perspective view of an example of the slider 95. FIG. 8 is a cross-sectional view of an example of the upper housing 91B, the slider 95, the first accommodating portion 110, and the leaf spring 150. In FIG. 8, only a portion (coupling plate 94 and protrusion 170 described below) of the slider 95 is illustrated.

As illustrated in FIG. 7, the slider 95 includes a pair of side plates 160 and 260 and a coupling plate 94 coupling the side plates 160 and 260. The side plates 160 and 260 are respectively located in an out-of-plane direction of the outer surfaces of the first sidewall 100 and second sidewall 200 of the lower housing 91A, and are each movable in the X-axis direction, along the outer surface of a corresponding sidewall among the first sidewall 100 and the second sidewall 200. A protrusion 161 extending in the negative Y-direction is formed at the rear end (positive X-side) of the side plate 160, and a protrusion 261 extending in the positive Y-direction is formed at the rear end (positive X-side) of the side plate 260. When the pull tab 96 is pulled in the negative X-direction, the protrusions 161 and 261 can be moved in the negative X-direction so that respective engagement pieces (not illustrated) to engage the cage can be pushed outwardly. The engagement pieces are provided on respective side surfaces of the cage, and are each bent inside the cage. When the optical transceiver 1 is inserted into the cage (not illustrated) of the host system, the engagement pieces described above contact the housing 91, thereby attaining a state in which the optical transceiver 1 is engaged with the cage of the host system. In such an engaged state, the housing 91 cannot be pulled out of the cage. By pulling the pull tab 96 in the negative X-direction, the slider 95 moves and thus the protrusions 161 and 261 push the respective engagement pieces of the cage outwardly, so that the engaged state is released. When the engaged state is released, the optical transceiver 1 can be removed from the cage. The slider 95 is an example of a movable member. The side plates 160 and 260 are examples of plates. The coupling plate 94 is an example of a bridging portion. The slider 95 may be formed by, for example, a sheet metal processing method using a single metal sheet.

A pair of protrusions 170 and 270 each protruding from the side surface of the coupling plate 94 in the positive X-direction, and then the negative Z-direction, is provided. As illustrated in FIG. 8, the protrusion 170 protrudes into the first accommodating portion 110. The protrusion 170 also has a fifth surface 175 that contacts the first pressing portion 151, a sixth surface 176 that faces the third surface 113 of the first accommodating portion 110, and a seventh surface 177 that contacts the first surface 111 of the first accommodating portion 110.

The upper housing 91B is secured to the lower housing 91A by using screws 93 (see FIG. 2). The upper housing 91B has a protrusion 97 proximal to the end 155 of the leaf spring 150 toward the second pressing portion 152. The protrusion 97 protrudes from the upper housing 91B toward the lower housing 91A (in the negative Z-direction). The lower surface of the coupling plate 94 is disposed proximal to the end 154 of the leaf spring 150 toward the first pressing portion 151. The lower surface of the coupling plate 94 is, for example, a surface parallel to the XY plane. With this arrangement, as in the limiting portion 130, the protrusion 97 and the coupling plate 94 limit a rotatable range of the leaf spring 150 in the ZX plane. Further, the travel of the leaf spring 150 in the positive Z-direction is limited such that the leaf spring 150 does not protrude from the first accommodating portion 110.

Hereafter, components accommodated in the housing 91 will be described. As illustrated in FIG. 2, the housing 91 houses a transmitter optical sub-assembly (TOSA) 11 and a receiver optical sub-assembly (ROSA) 12. The housing 91 also houses a wiring substrate 20, flexible printed circuits (FPCs) 31 and 32, and a digital signal processor (DSP) 40.

The TOSA 11 and the wiring substrate 20 are coupled to each other via the FPC 31, and the ROSA 12 and the wiring substrate 20 are coupled to each other via the FPC 32. The DSP 40 is provided on the top surface of the wiring substrate 20. The DSP 40 processes electrical signals to be used when each of the TOSA 11 and ROSA 12 performs photoelectric conversion, and the electrical signals are transmitted to the DSP 40 via one or more wirings formed on the wiring substrate 20 and via a given printed circuit among the FPCs 31 and 32.

A terminal group 23 including a plurality of external terminals is provided at each of rear ends of the upper surface and lower surface of the wiring substrate 20. Upon inserting the optical transceiver 1 into the cage of the host system, terminals of the terminal group 23 are respectively coupled to terminals provided with respect to the cage. For example, the terminal group 23 constitutes an electric plug and the electric plug fits into an electrical socket that is constituted by the terminals provided with respect to the cage. When the electric plug engages with the electric socket, a given terminal among the terminal group 23 and a given terminal among the terminals provided with respect to the cage are electrically coupled to each other, on a one-to-one basis. Power required to operate the optical transceiver 1 is supplied from the host system via the terminal group 23 and thus electrical signals are transmitted and received between the host system and the optical transceiver 1.

Figure 9:
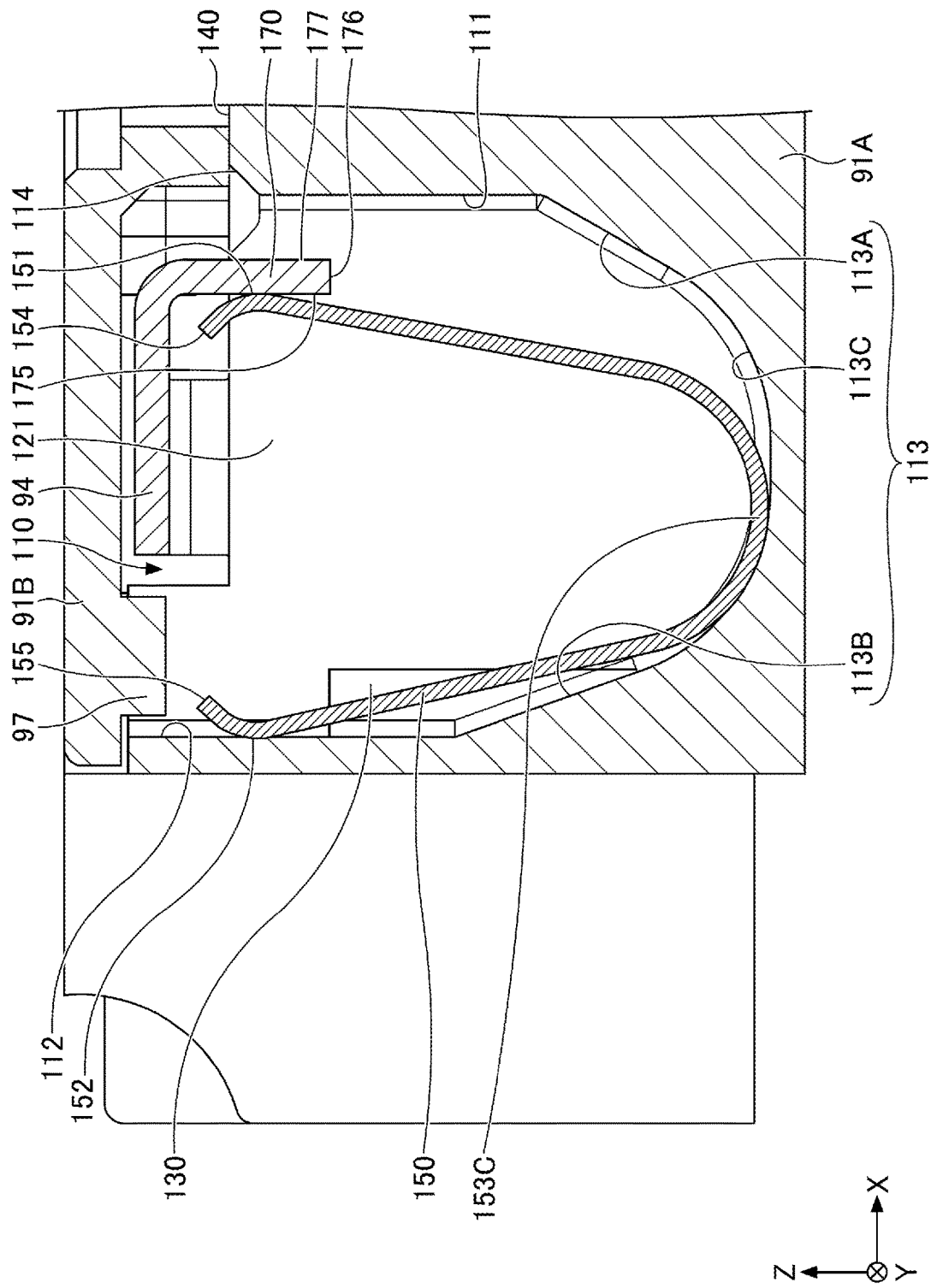
FIG. 9 is a cross-sectional view of an example of the leaf spring when the pull tab is pulled forward.

Hereafter, the function of the slider 95 will be described. FIG. 9 is a cross-sectional view of an example of the leaf spring 150 when the pull tab 96 is pulled forward (in the negative X-direction).

When the pull tab 96 is pulled forward (in the negative X-direction), the slider 95 coupled to the pull tab 96 moves relative to the housing 91 in the negative X-direction. As a result, the protrusion 161 slides with respect to the outer surface of the first sidewall 100 to thereby push a given engagement piece (not illustrated) of the cage, toward the negative Y-direction, and thus the housing 91 is disconnected from the cage of the host system. In this case, the protrusion 261 also slides with respect to the outer surface of the first sidewall 100 to thereby push another engagement piece (not illustrated) of the cage, toward the positive Y-direction. With this arrangement, by pulling the pull tab 96 forward (in negative X-direction), the slider 95 slides, thereby releasing the engagement of the housing 91 with the cage of the host system. Therefore, the optical transceiver 1 inserted into the cage of the host system can be removed from the cage.

The second pressing portion 152 presses the second surface 112 of the first accommodating portion 110, and the first pressing portion 151 presses the protrusion 170 toward the first surface 111 of the first accommodating portion 110. In such a manner, when pulling of the pull tab 96 is released, the slider 95 moves relative to the housing 91 in the positive X-direction, and thus the optical transceiver 1 returns to the state illustrated in FIG. 8. That is, the leaf spring 150 is deformed in accordance with the movement of the protrusion 170 in the negative X-direction, and the resulting reaction force from the deformation of the leaf spring 150 causes the protrusion 170 to be pushed back in the positive X-direction, so that the pull tab 96 thereby returns to an initial position. When the pull tab 96 is in the initial position, the housing 91 is engaged with the cage of the host system and thus the housing 91 cannot be removed from the cage.

As illustrated in FIG. 7, the positive X-side ends of the side plates 160 and 260 are folded such that under a condition in which the pull tab 96 is yet to be pulled forward (in the negative X-direction), the protrusions 161 and 261 do not push out the respective engagement pieces of the cage. For example, the protrusion 161 is bent toward the positive Y-direction with respect to the side plate 160, and the protrusion 261 is bent toward the negative Y-direction with respect to the side plate 260.

Figure 14:
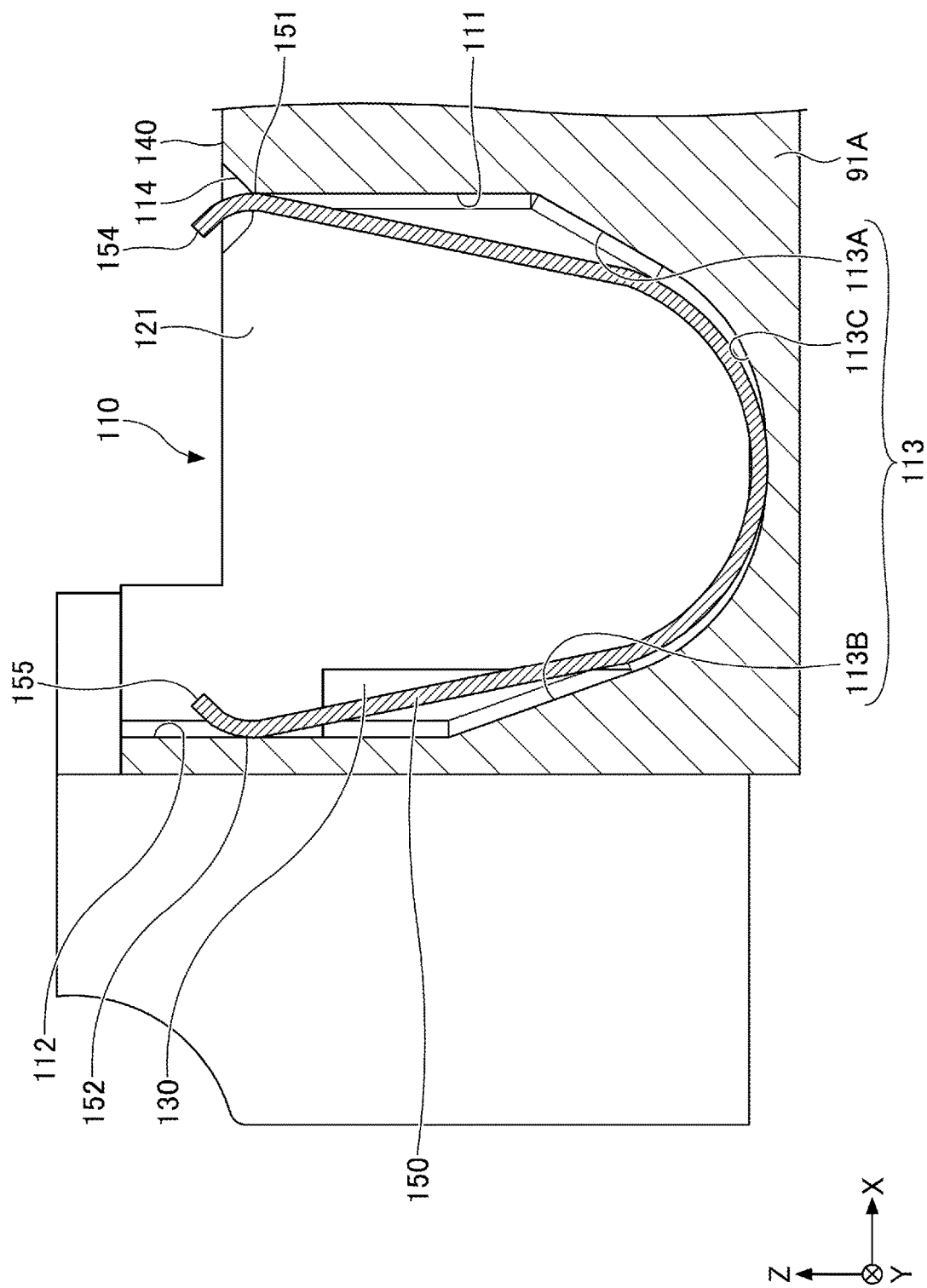
FIG. 14 is a cross-sectional view (first part) of an example of the optical transceiver in the method for assembling the optical transceiver according to one embodiment.
Figure 15:
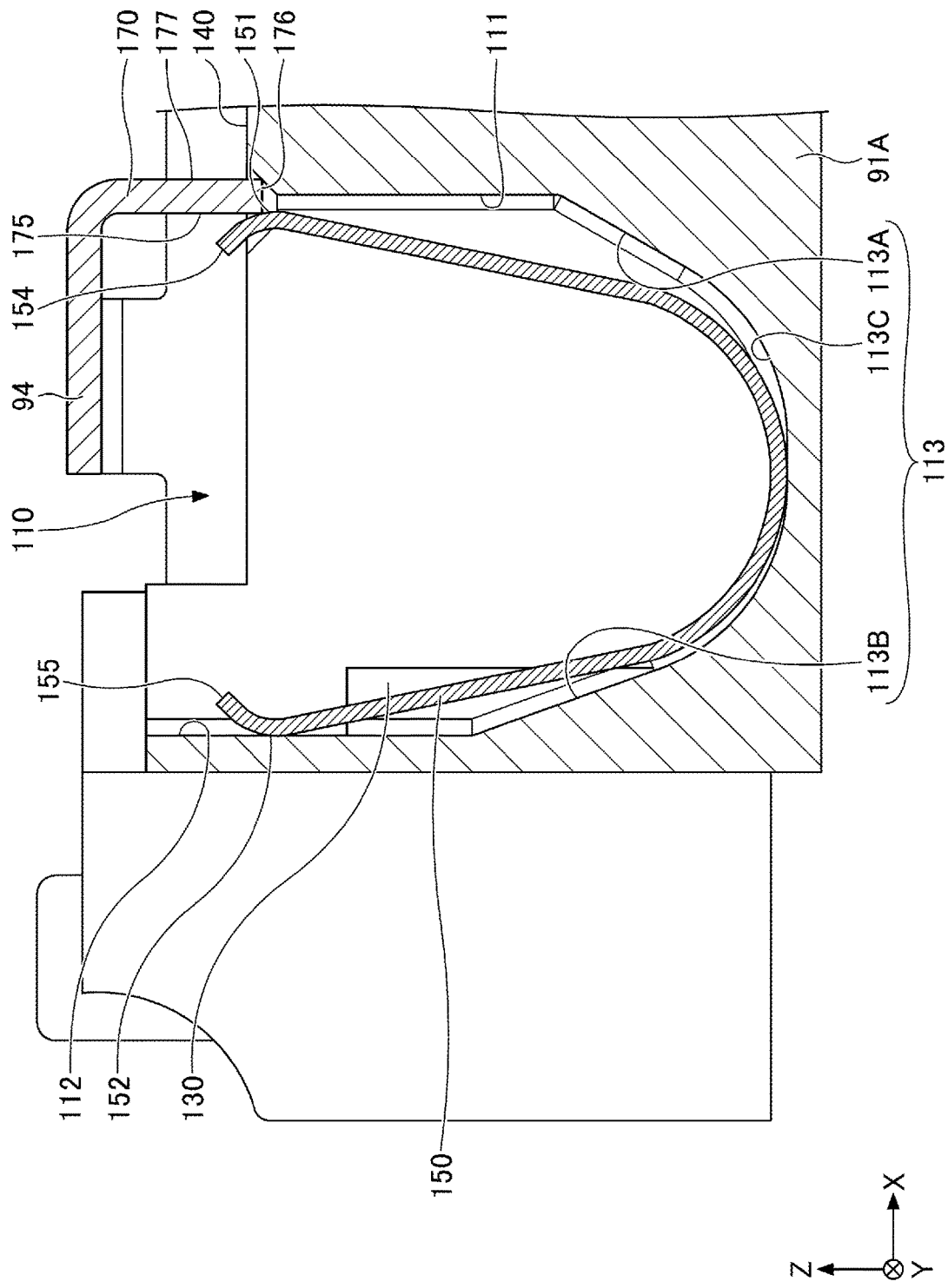
FIG. 15 is a cross-sectional view (second part) of the optical transceiver in the method for assembling the optical transceiver according to one embodiment.
Figure 16:
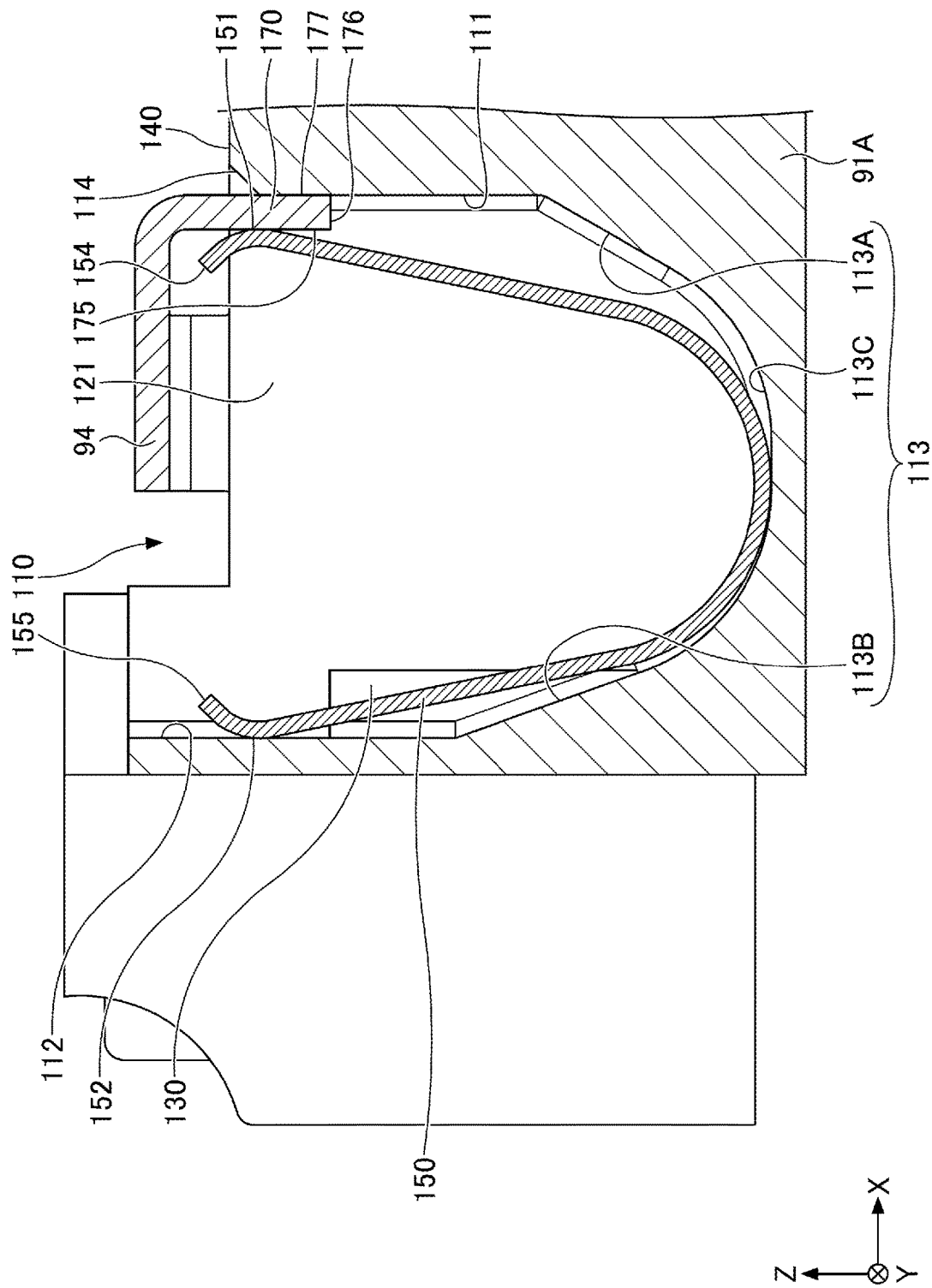
FIG. 16 is a cross-sectional view (third part) of an example of the optical transceiver in the method for assembling the optical transceiver according to one embodiment.

Hereafter, a method of assembling the optical transceiver 1 will be described. FIGS. 10 to 13 are perspective views of an example of the optical transceiver 1 in the method of assembling the optical transceiver 1 according to one embodiment. FIGS. 14 to 16 are cross-sectional views of an example of the optical transceiver 1 in the method of assembling the optical transceiver 1 according to one embodiment.

Figure 10:
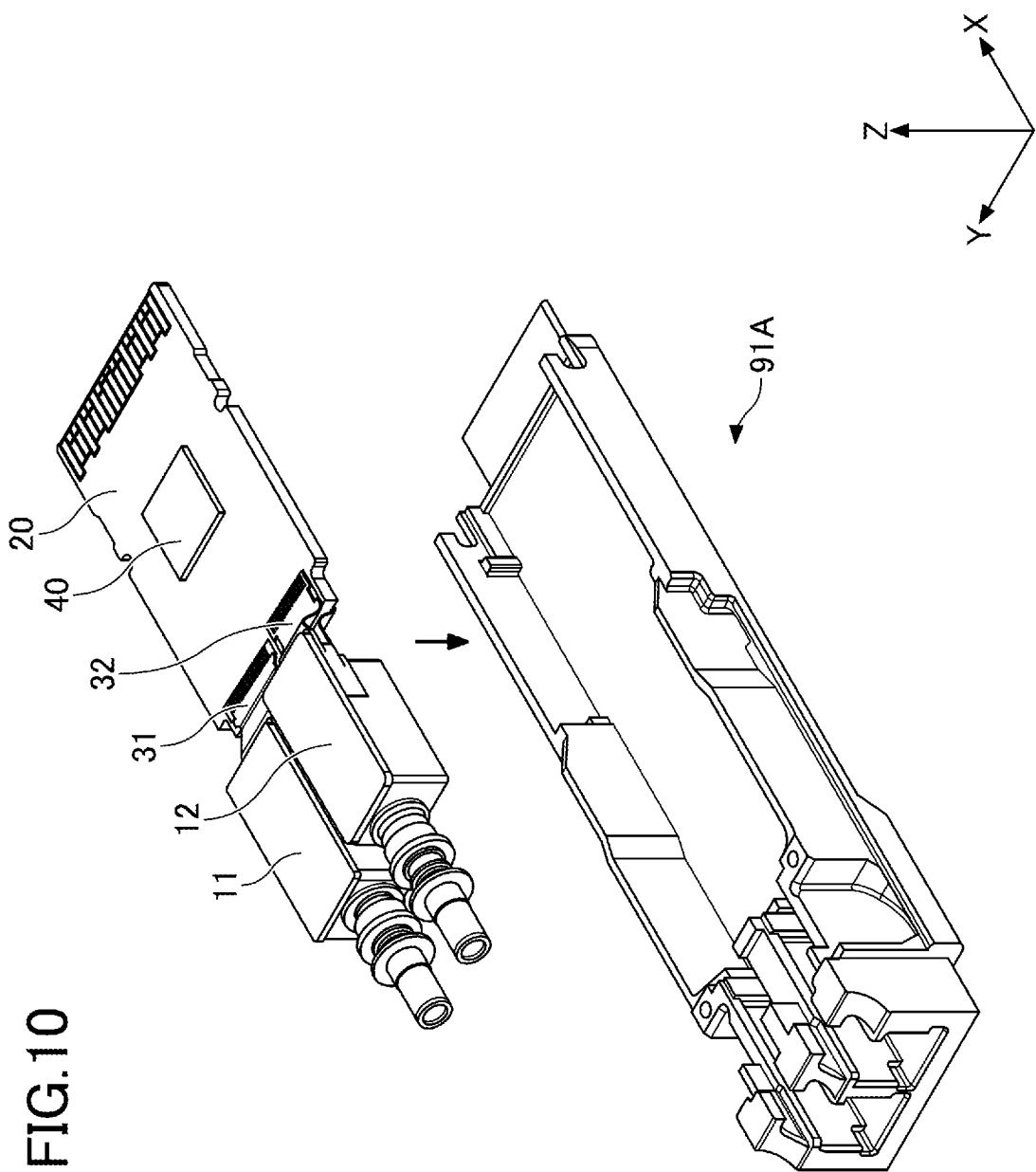
FIG. 10 is a perspective view (first part) of an example of the optical transceiver in a method for assembling the optical transceiver according to one embodiment.

As illustrated in FIG. 10, the DSP 40 is provided on the wiring substrate 20, the TOSA 11 is coupled to the wiring substrate 20 via the FPC 31, and the ROSA 12 is coupled to the wiring substrate 20 via the FPC 32. For example, the DSP 40 may be provided on the surface of the wiring substrate 20 by a solder reflow process, together with other circuit components. For connection of each of the FPCs 31 and 32, for example, respective terminals of a given printed circuit among the FPCs 31 and 32 may be coupled to a terminal of the wiring substrate 20 and a terminal of a given assembly among the TOSA 11 and the ROSA 12, with solder. Then, an opening of the lower housing 91A is oriented in the positive Z-direction, and the TOSA 11, the ROSA 12, and the wiring substrate 20 are moved from the positive Z-side of the lower housing 91A to the negative Z-side thereof. With this arrangement, the TOSA 11, the ROSA 12, and the wiring substrate 20 are housed in an inner space of the lower housing 91A. For example, in the X-axis direction, both the TOSA 11 and the ROSA 12 are disposed between a pair of the optical receptacles 92R and 92T and the wiring substrate 20.

Figure 11:
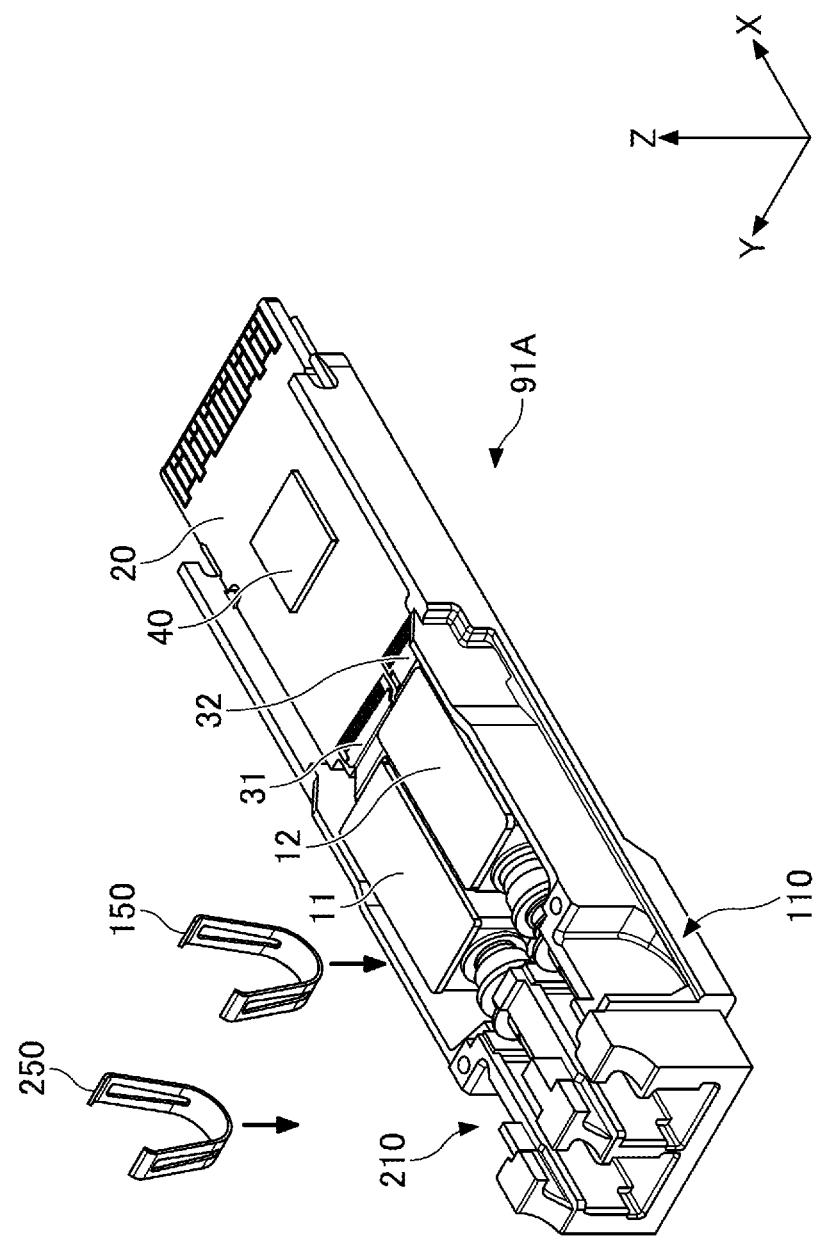
FIG. 11 is a perspective view (second part) of an example of the optical transceiver in the method for assembling the optical transceiver according to one embodiment.

Then, as illustrated in FIG. 11, an opening of the first accommodating portion 110 and an opening of the second accommodating portion 210 are oriented in the positive Z-direction, and the leaf springs 150 and 250 are moved from the positive Z-side of the lower housing 91A toward the negative Z-side, so that the leaf springs 150 and 250 are respectively accommodated in the first accommodating portion 110 and the second accommodating portion 210. As described above, in the natural state (initial state), the maximum size of the leaf spring 150 in the X-axis direction is greater than a distance between the first surface 111 and the second surface 112 of the first accommodating portion 110. With this arrangement, when the leaf spring 150 is moved in the negative Z-direction, as illustrated in FIG. 14, the leaf spring 150 is compressed in the X-axis direction, while the first pressing portion 151 contacts the first surface 111 of the first accommodating portion 110 and the second pressing portion 152 contacts the second surface 112 of the first accommodating portion 110. As a result, the leaf spring 150 is accommodated in the first accommodating portion 110. Therefore, without a load in the X-axis direction being externally applied to the leaf spring 150, the leaf spring 150 can be accommodated in the first accommodating portion 110, in a state in which a preload is applied to the leaf spring 150. Further, because the limiting portion 130 passes through the second slit 157, and the top portion 153D of the leaf spring 150 contacts the curved surface 113C of the third surface 113 of the first accommodating portion 110, a rotatable range of the leaf spring 150 in the ZX plane is limited. Therefore, removal of the leaf spring 150 from the first accommodating portion 110 can be suppressed due to the preload (reaction force).

Figure 12:
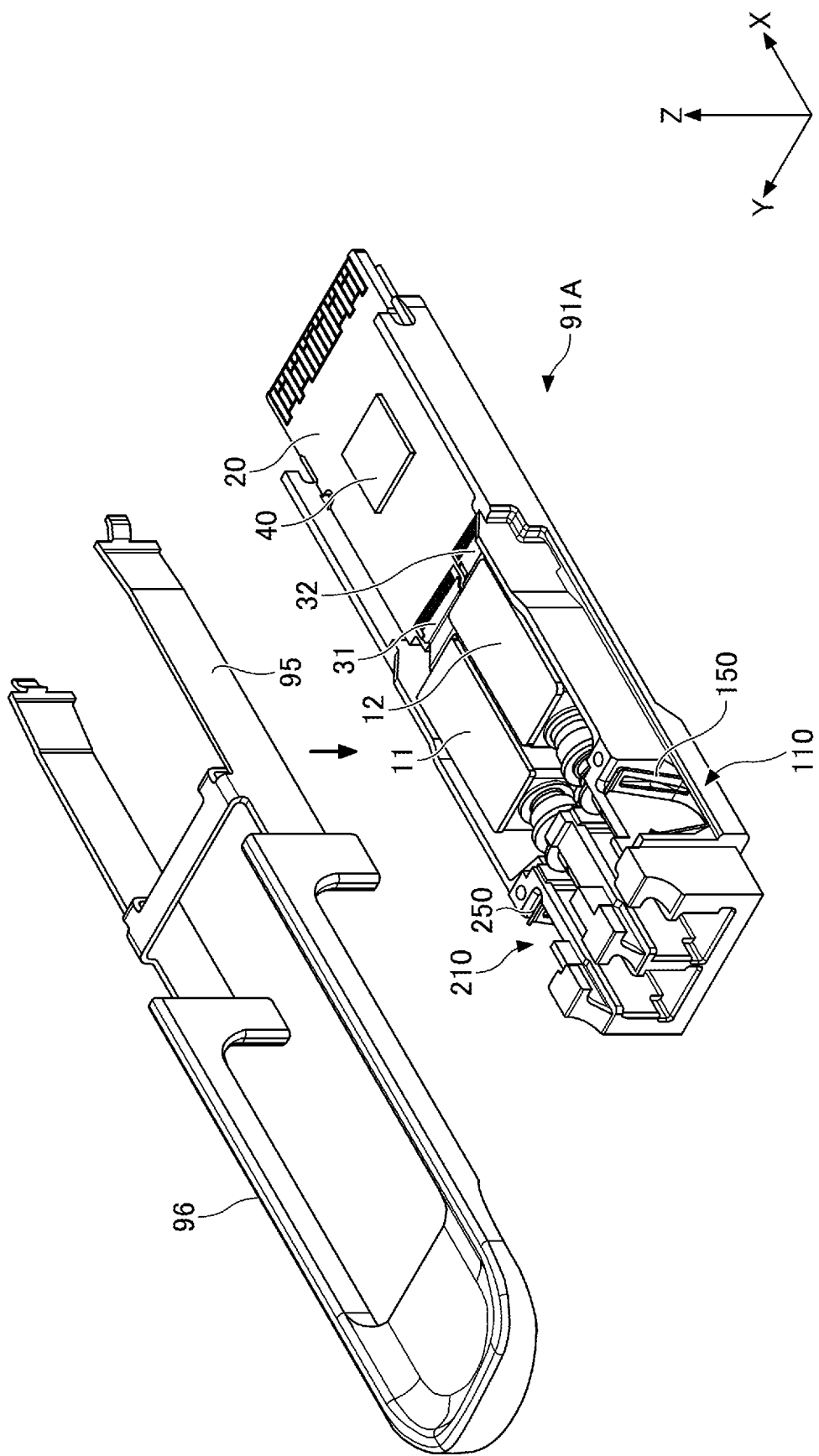
FIG. 12 is a perspective view (third part) of an example of the optical transceiver in a method for assembling the optical transceiver according to one embodiment.

Then, as illustrated in FIG. 12, the slider 95 and the pull tab 96 are integrated together, and subsequently an integrated component of the slider 95 and the pull tab 96 is moved from the positive Z-side of the lower housing 91A toward the negative Z-side, thereby attaching the slider 95 and the pull tab 96 to the lower housing 91A. In this case, in the X-axis direction, the protrusion 170 is positioned so as to contact the outer surface of the end 154 of the leaf spring 150, or the fourth surface 114 of the upper housing 91B. After the positioning of the protrusion 170, when the slider 95 is moved in the negative Z-direction, the protrusion 170 moves into the first accommodating portion 110, along the fourth surface 114 of the lower housing 91A, as illustrated in FIG. 15. Also, the fifth surface 175 of the protrusion 170 contacts the first pressing portion 151 and thus the first pressing portion 151 moves in the negative X-direction. As a result, as illustrated in FIG. 16, the protrusion 170 is inserted between the first pressing portion 151 and the first surface 111 of the first accommodating portion 110 to thereby enter the first accommodating portion 110. Thus, the seventh surface 177 of the protrusion 170 contacts the first surface 111 of the first accommodating portion 110, so that the state of the slider 95 is stabilized.

Figure 13:
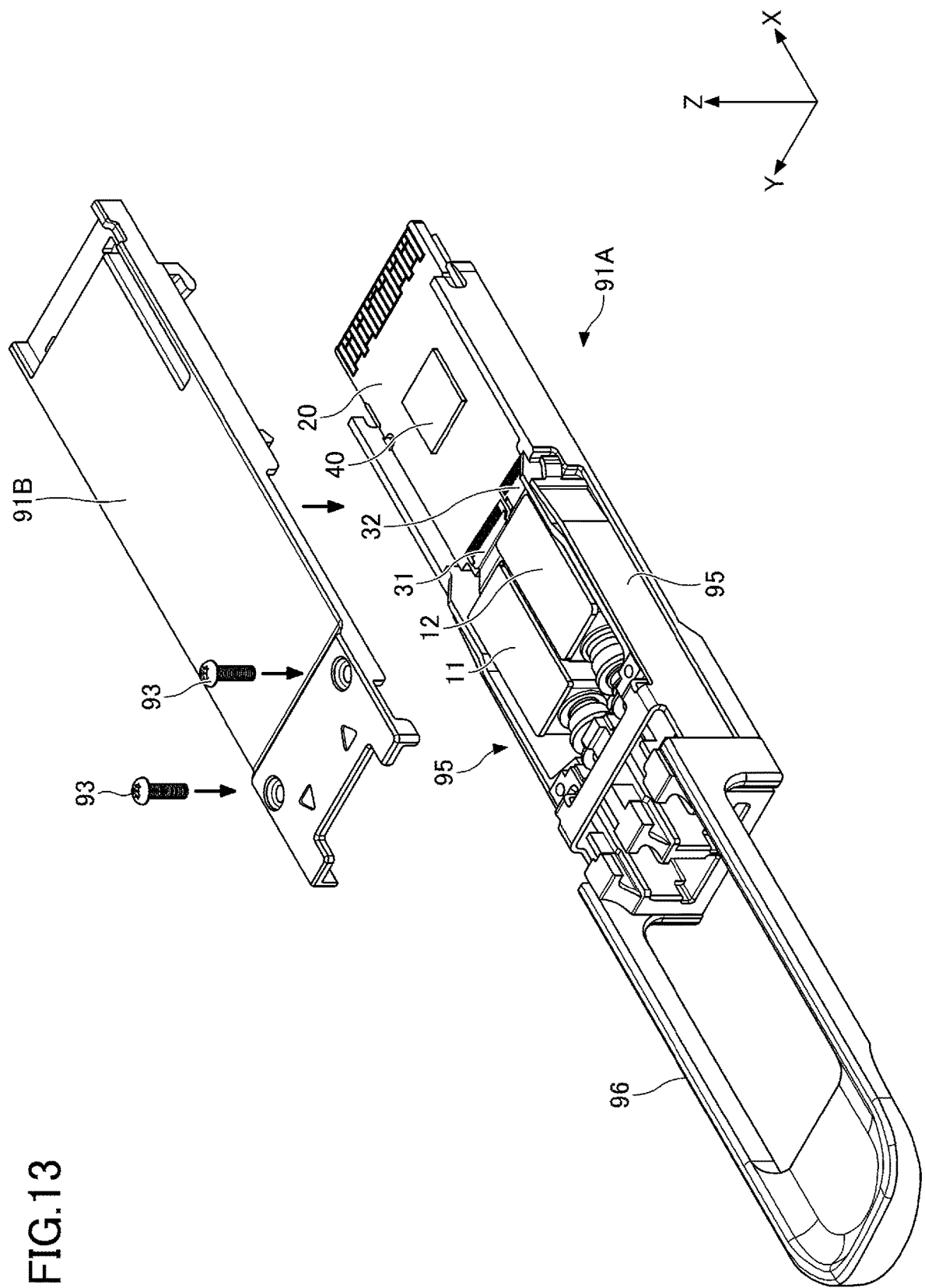
FIG. 13 is a perspective view (fourth part) of an example of the optical transceiver in the method for assembling the optical transceiver according to one embodiment.

Then, as illustrated in FIG. 13, the upper housing 91B is moved from the positive Z-side of the lower housing 91A toward the negative Z-side, to thereby mount the upper housing 91B on the lower housing 91A. Next, by moving the screws 93 from the positive Z-side of the lower housing 91A toward the negative Z-side, the upper housing 91B is screwed through screw holes provided in the lower housing 91A, and thus the upper housing 91B is secured to the lower housing 91A.

In such a manner, the optical transceiver 1 according to one embodiment can be assembled.

In order to assemble the optical transceiver 1 according to the present embodiment, the leaf spring 150 is inserted into the first accommodating portion 110 such that the coupling portion 153 contacts the third surface 113 of the first accommodating portion 110. With this arrangement, without any load being externally applied to each of the first pressing portion 151 and the second pressing portion 152, the first pressing portion 151 contacts the first surface 111 of the first accommodating portion 110, and further the second pressing portion 152 contacts the second surface 112 of the first accommodating portion 110, so that a preload is applied to the leaf spring 150. In this case, the end 154 of the leaf spring 150 toward the first pressing portion 151 is configured to curve away from the first surface 111 of the first accommodating portion 110 in the X-axis direction as the distance from the first pressing portion 151 increases. With this arrangement, the protrusion 170 of the slider 95 can be easily inserted between the first pressing portion 151 and the first surface 111 of the first accommodating portion 110. Accordingly, the leaf spring 150 and the slider 95 can be attached to the housing by simple operations.

Further, during assembly of the optical transceiver 1, the direction of components being moved toward the lower housing 91A can be directed to the negative Z-direction. Thus, it is extremely easy to control machines such as robots, when an assembly process is automated. In this description, examples of the above components include the leaf spring 150, the slider 95, and the upper housing 91B.

When the leaf spring 150 is accommodated in the first accommodating portion 110, the coupling portion 153 preloads the first pressing portion 151 and the second pressing portion 152 in a direction in which those pressing portions are apart from each other, because the leaf spring 150 is preloaded as described above. With this arrangement, after the optical transceiver 1 is removed from the cage, the slider 95 is easily returned to a position set prior to the removal of the optical transceiver 1.

The end 154 of the leaf spring 150 toward the first pressing portion 151 is curved at an angle in the range of from 50 degrees through 70 degrees, relative to the flat plate 153A, and thus the protrusion 170 is easily inserted between the end 154 of the leaf spring 150 and the first surface 111 of the first accommodating portion 110.

The first slit 156 and the second slit 157 that are each shaped appropriately are formed in the coupling portion 153. With this arrangement, variations in the magnitude of the reaction force (stress) of the leaf spring 150 to act on the coupling portion 153 are reduced, and thus deterioration of the leaf spring 150 due to stress concentration is easily mitigated.

The lower housing 91A has the fourth surface 114. With this arrangement, by moving the protrusion 170 along the fourth surface 114 of the lower housing 91A, the protrusion 170 is easily inserted between the end 154 of the leaf spring 150 and the first surface 111 of the first accommodating portion 110.

The first accommodating portion 110 includes the curved surface 113C in a region of the third surface 113 in contact with the coupling portion 153, and the curved surface 113C is curved with a second radius of curvature that is greater than a first radius of curvature of the coupling portion 153. With this arrangement, rotation of the leaf spring 150 can be limited, while enabling the leaf spring 150 to be deformed in accordance with movement of the slider 95.

The slider 95 includes a pair of side plates 160 and 260. With this arrangement, when the optical transceiver 1 is removed from the cage, lords applied to the slider 95 from the pull tab 96 can be distributed. Further, the pair of side plates 160 and 260 are coupled by the coupling plate 94, and thus loading eccentricity between the side plates 160 and 260 can be reduced.

Figure 17:
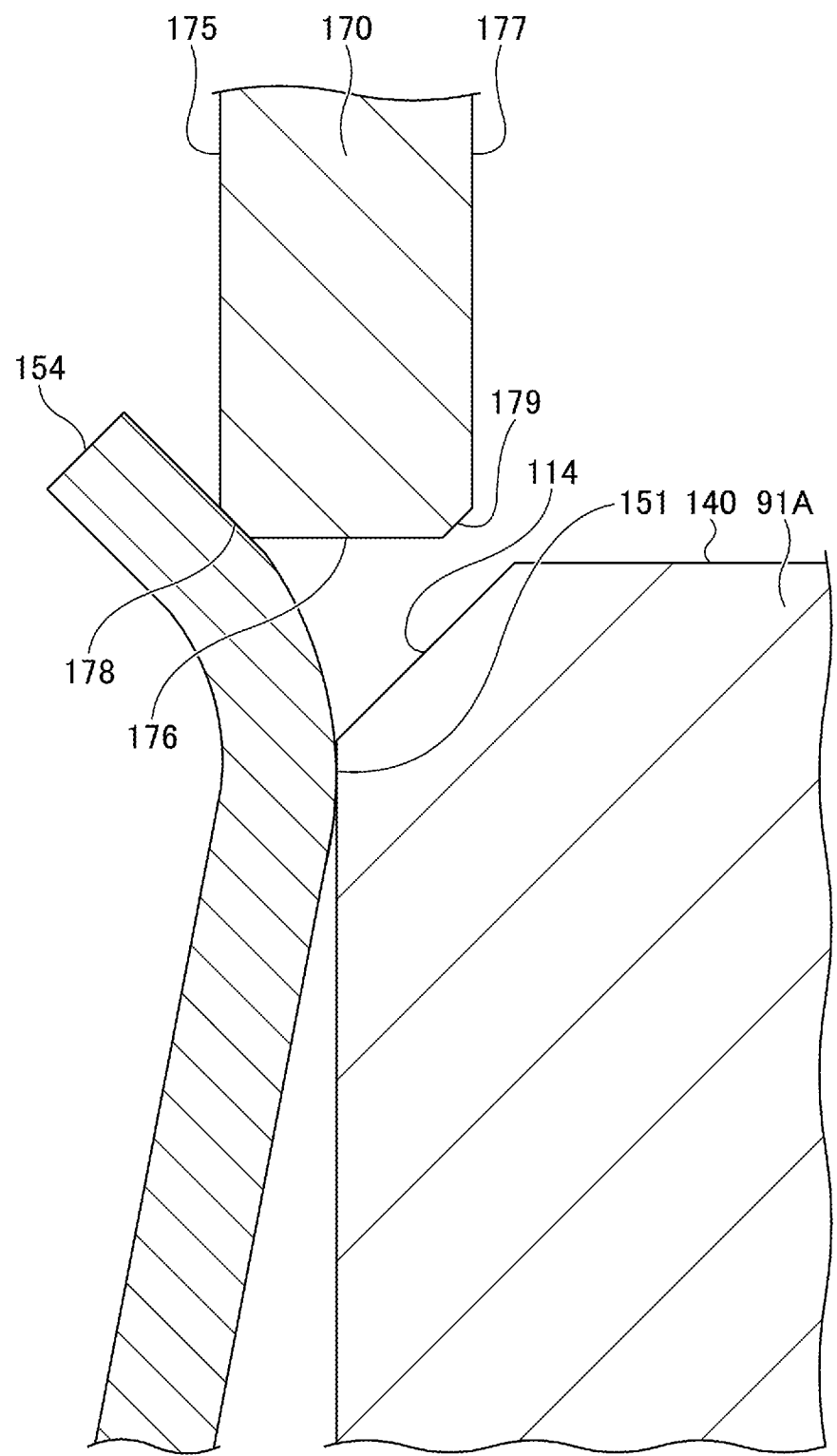
FIG. 17 is a cross-sectional view of an example of a protrusion.

As illustrated in FIG. 17, the protrusion 170 may have an eighth surface 178 formed by chamfering a portion of the protrusion 170 at which the fifth surface 175 and the sixth surface 176 of the protrusion meet. By forming the eighth surface 178 of the protrusion 170, the end 154 of the leaf spring 150 contacts the eighth surface 178 of the protrusion 170 and thus the protrusion 170 is easily inserted between the end 154 of the leaf spring 150 and the first surface 111 of the first accommodating portion 110. Likewise, the protrusion 170 may have a ninth surface 179 formed by chamfering a portion of the protrusion 170 at which the seventh surface 177 and the sixth surface 176 of the protrusion meet. With this arrangement, the ninth surface 179 of the protrusion 170 is in contact with the fourth surface 114 of the upper housing 91B and thus the protrusion 170 is easily inserted between the end 154 of the leaf spring 150 and the first surface 111 of the first accommodating portion 110. A chamfer of each of the eighth surface 178 and the ninth surface 179 of the protrusion 170 is, for example, an edge cut at any angle, but may be a rounded-curve edge. FIG. 17 is a cross-sectional view of an example of the protrusion 170.

The embodiments have been described in detail above. However, the present disclosure is not limited to the embodiments. Various modifications, changes, substitutions, or any combination of embodiments can be made within the scope set forth in the present disclosure.

What is claimed is:

1. An optical transceiver comprising;
a housing extending in a longitudinal direction of the optical transceiver, the housing including a groove-shaped accommodating portion that extends in the longitudinal direction, the housing being configured to be inserted and removed from a cage of an external device, and the accommodating portion including
a first surface and a second surface that are apart from each other in the longitudinal direction, the longitudinal direction being a direction in which the housing is to be inserted into the cage, and
a third surface constituting a bottom of the accommodating portion, the third surface coupling the first surface and the second surface;
a movable member including a protrusion that protrudes into the accommodating portion, the movable member being attached to the housing in a state where the movable member is movable in the longitudinal direction, within a predetermined distance; and
a spring member that is a curved leaf spring member and is accommodated in the accommodating portion, the spring member including
a first pressing portion pressing the protrusion toward the first surface of the accommodating portion, the first pressing portion having an end,
a second pressing portion pressing, in the longitudinal direction, the second surface of the accommodating portion, in a direction in which the second surface of the accommodating portion is away from the first surface of the accommodating portion, and
a coupling portion that is curved and couples the first pressing portion and the second pressing portion, the coupling portion being in contact with the third surface of the accommodating portion,
wherein the end of the spring member toward the first pressing portion is configured to curve away from the first surface of the accommodating portion in the longitudinal direction as a distance from first pressing portion increases.

2. The optical transceiver according to claim 1, wherein the spring member is accommodated in the accommodating portion so that the coupling portion of the spring member preloads the first pressing portion and the second pressing portion in a direction in which the first pressing portion and the second pressing portion are apart from each other.

3. The optical transceiver according to claim 1, wherein the coupling portion of the spring member includes a flat plate coupled to the first pressing portion, and
wherein the end of the first pressing portion of the spring member is curved, toward the second pressing portion, at an angle relative to the flat plate, the angle being greater than or equal to 50 degrees and less than or equal to 70 degrees.

4. The optical transceiver according to claim 1, wherein the spring member includes
a first slit extending from the first pressing portion toward the third surface of the accommodating portion, the first slit having a width that increases toward the first pressing portion from the coupling portion, and
a second slit extending from the second pressing portion toward the third surface of the accommodating portion, the second slit having a width that increases toward the second pressing portion from the coupling portion.

5. The optical transceiver according to claim 4, wherein the accommodating portion includes a limiting portion that protrudes from the second surface of the accommodating portion toward the first surface of the accommodating portion, the limiting portion passing through the second slit, and the limiting member limiting a range of travel of the spring member.

6. The optical transceiver according to claim 1, wherein the accommodating portion includes a fourth surface coupled to an edge of the first surface of the accommodating portion opposite the third surface thereof, and
wherein the fourth surface of the accommodating portion is inclined away from the second surface of the accommodating portion in the longitudinal direction as a distance from the edge of the first surface thereof increases.

7. The optical transceiver according to claim 1, wherein the protrusion includes a fifth surface in contact with the first pressing portion and a sixth surface facing the third surface of the accommodating portion, and
wherein a portion of the protrusion at which the fifth surface and sixth surface meet is chamfered.

8. The optical transceiver according to claim 1, wherein a portion of the coupling portion in contact with the third surface of the accommodating portion is curved with a first radius of curvature, and
wherein the third surface of the accommodating portion includes a curved surface within a region of the accommodating portion in contact with the coupling portion, the curved surface being formed with a second radius of curvature greater than the first radius of curvature.

9. The optical transceiver according to claim 1, wherein the movable member includes a pair of plates attached to the housing such that the housing is interposed between the pair of plates in a transverse direction of the housing perpendicular to the longitudinal direction.

10. The optical transceiver according to claim 9, wherein the movable member further includes a bridging portion for bridging the pair of plates.

* * * * *